United States Patent
Oya et al.

(10) Patent No.: US 10,241,731 B2
(45) Date of Patent: Mar. 26, 2019

(54) INFORMATION PROCESSING APPARATUS, METHOD OF CONTROLLING THE SAME, PRINT SYSTEM AND STORAGE MEDIUM

(71) Applicant: CANON KABUSHIKI KAISHA, Tokyo (JP)

(72) Inventors: Hiroshi Oya, Nagareyama (JP); Naoki Morita, Kashiwa (JP); Takashi Okazawa, Tokyo (JP); Toru Sakaguchi, Kashiwa (JP); Chie Ito, Abiko (JP)

(73) Assignee: Canon Kasbushiki Kaisha, Tokyo (JP)

( * ) Notice: Subject to any disclaimer, the term of this patent is extended or adjusted under 35 U.S.C. 154(b) by 0 days.

(21) Appl. No.: 15/228,178

(22) Filed: Aug. 4, 2016

(65) Prior Publication Data

US 2017/0060488 A1    Mar. 2, 2017

(30) Foreign Application Priority Data

Aug. 25, 2015   (JP) .................................. 2015-166186

(51) Int. Cl.
| | | |
|---|---|---|
| *H04N 1/04* | (2006.01) | |
| *G06F 3/12* | (2006.01) | |
| *G06F 9/4401* | (2018.01) | |

(52) U.S. Cl.
CPC .......... *G06F 3/1209* (2013.01); *G06F 3/1224* (2013.01); *G06F 3/1284* (2013.01); *G06F 9/4411* (2013.01)

(58) Field of Classification Search
CPC ..... G06F 3/1209; G06F 3/1224; G06F 3/1284
USPC ....................................... 358/1.15, 1.14, 1.9
See application file for complete search history.

(56) References Cited

U.S. PATENT DOCUMENTS

| | | |
|---|---|---|
| 6,459,496 B1 | 10/2002 | Okazawa |
| 6,785,012 B2 | 8/2004 | Okazawa |
| 7,260,637 B2 | 8/2007 | Kato |
| 7,437,467 B2 | 10/2008 | Kato |
| 7,660,555 B2 | 2/2010 | Morita |

(Continued)

FOREIGN PATENT DOCUMENTS

| | | |
|---|---|---|
| JP | 2002-202871 A | 7/2002 |
| JP | 2014-134861 A | 7/2014 |

OTHER PUBLICATIONS

Japanese Office Action dated Jan. 15, 2019, issued in Japanese Patent Application No. 2015-166186.

*Primary Examiner* — Houshang Safaipour
(74) *Attorney, Agent, or Firm* — Venable LLP

(57) ABSTRACT

An information processing apparatus has a printer driver and a device service associated with the printer driver as an output port of a print job generated by the printer driver. The printer driver receives data in accordance with a print instruction from an application operating on the information processing apparatus, generates a print job based on the received data, and outputs the print job to the output port. The print job is sent to the device service by an operating system using internal loopback. The device service connects to a print apparatus via a port that is different from the output port of the information processing apparatus, receives the print job from the printer driver, transmits a first control command for obtaining status information to the print apparatus, obtains the status information of the apparatus, and accepts print data received through a receiving port.

11 Claims, 17 Drawing Sheets

(56) References Cited

U.S. PATENT DOCUMENTS

| | | |
|---|---|---|
| 8,644,718 B2 | 2/2014 | Oya |
| 9,007,641 B2 | 4/2015 | Morimoto |
| 9,137,021 B2 | 9/2015 | Okazawa |
| 9,329,814 B2 * | 5/2016 | Nagasawa ............. G06F 3/1236 |
| 2005/0018236 A1 * | 1/2005 | Shirai ................... G06F 3/1204 |
| | | 358/1.14 |
| 2006/0007487 A1 | 1/2006 | Okazawa |
| 2013/0141759 A1 | 6/2013 | Morita |
| 2013/0212602 A1 * | 8/2013 | Yamazaki ............. G06F 13/102 |
| | | 719/321 |
| 2014/0153018 A1 * | 6/2014 | Mitsui ................. H04N 1/4413 |
| | | 358/1.13 |
| 2014/0376015 A1 | 12/2014 | Oya |
| 2015/0178031 A1 * | 6/2015 | Kanamori ............ G06F 3/1288 |
| | | 358/1.15 |
| 2017/0024173 A1 * | 1/2017 | Iwamoto ............... G06F 3/1205 |

* cited by examiner

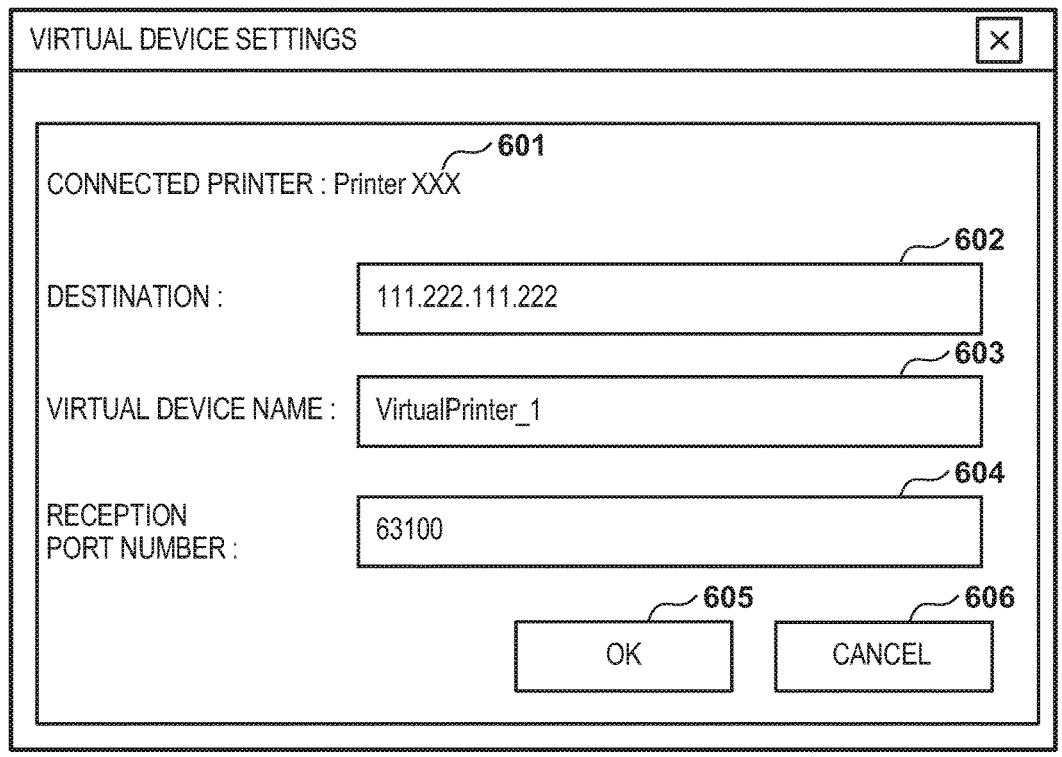
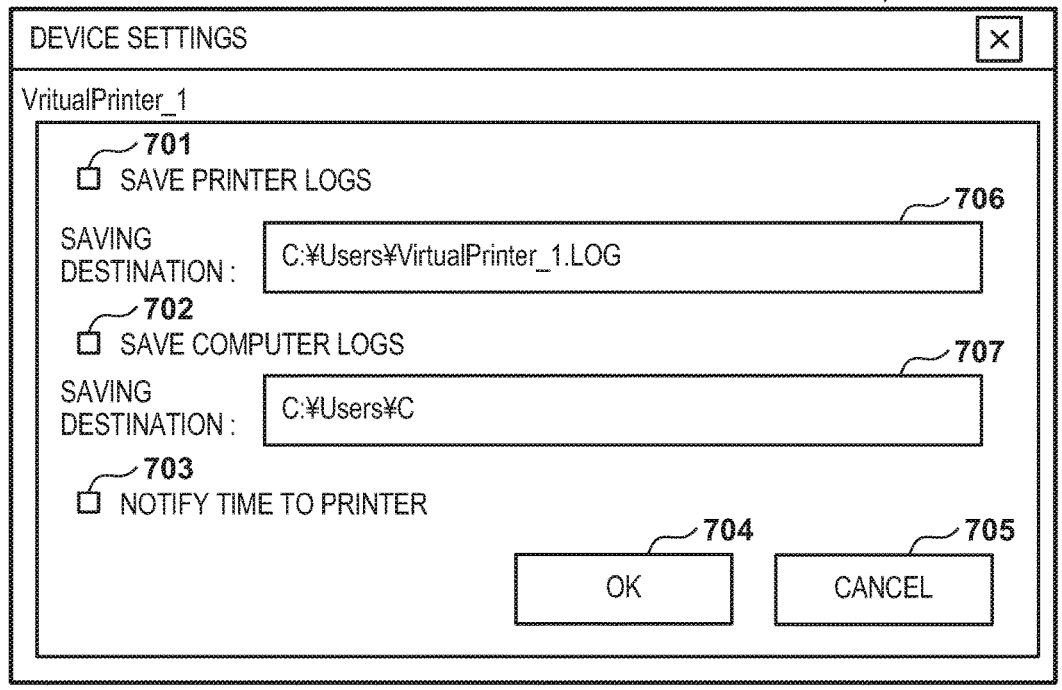

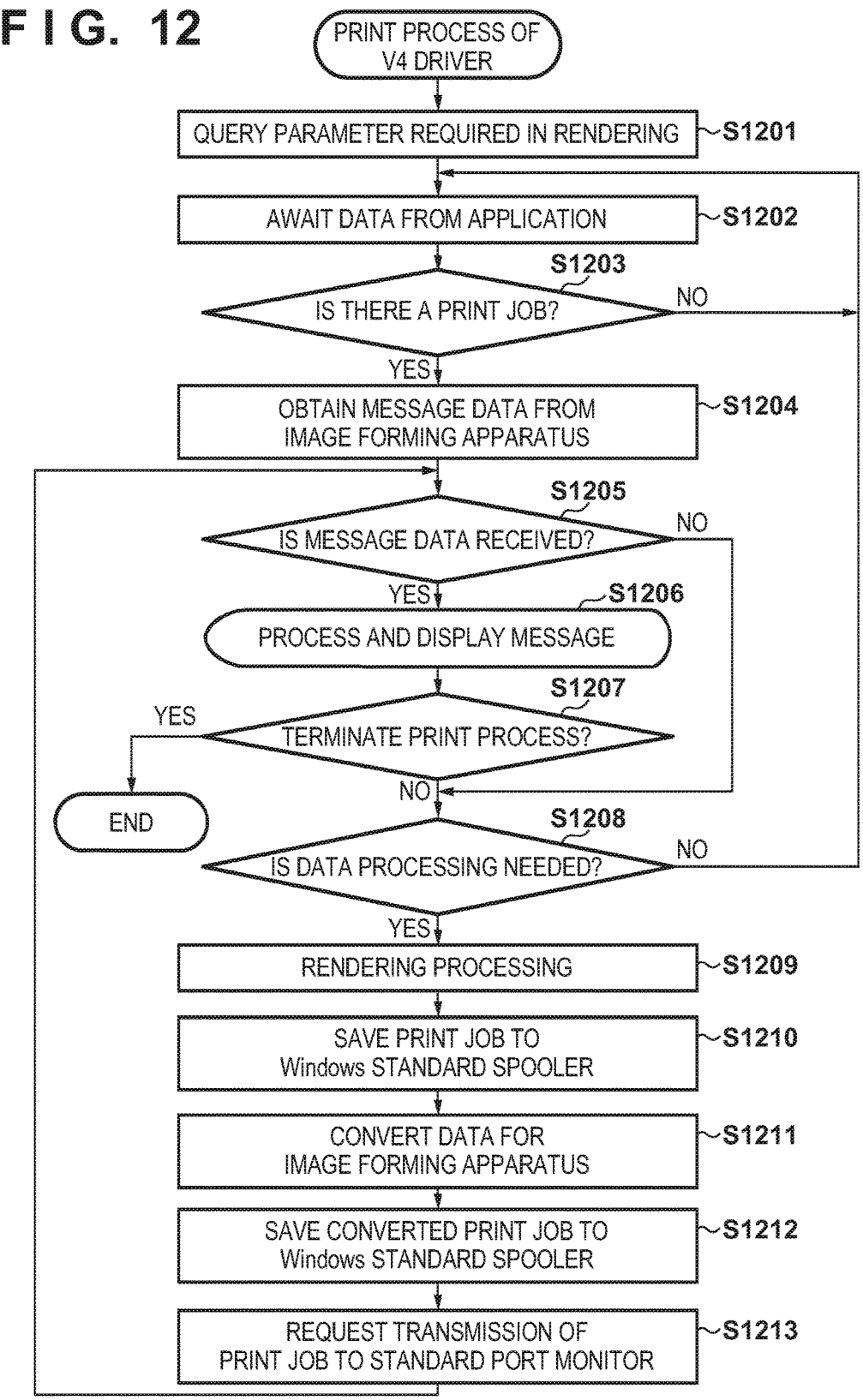

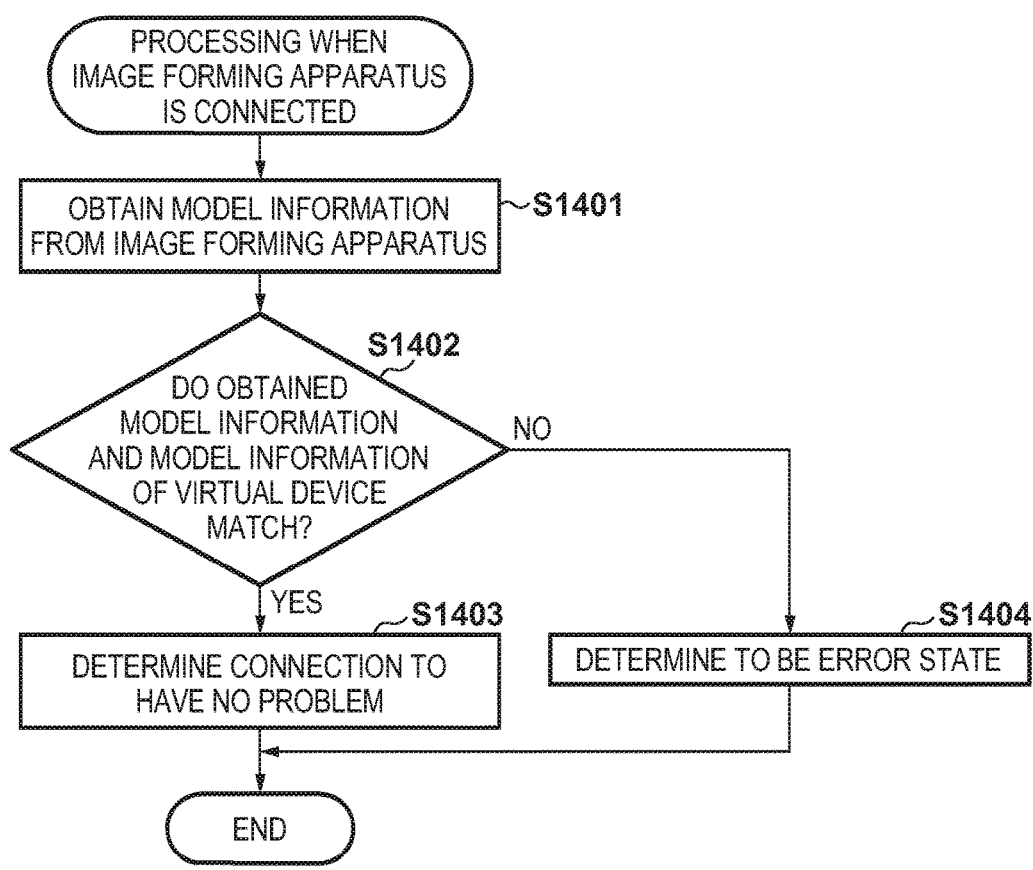

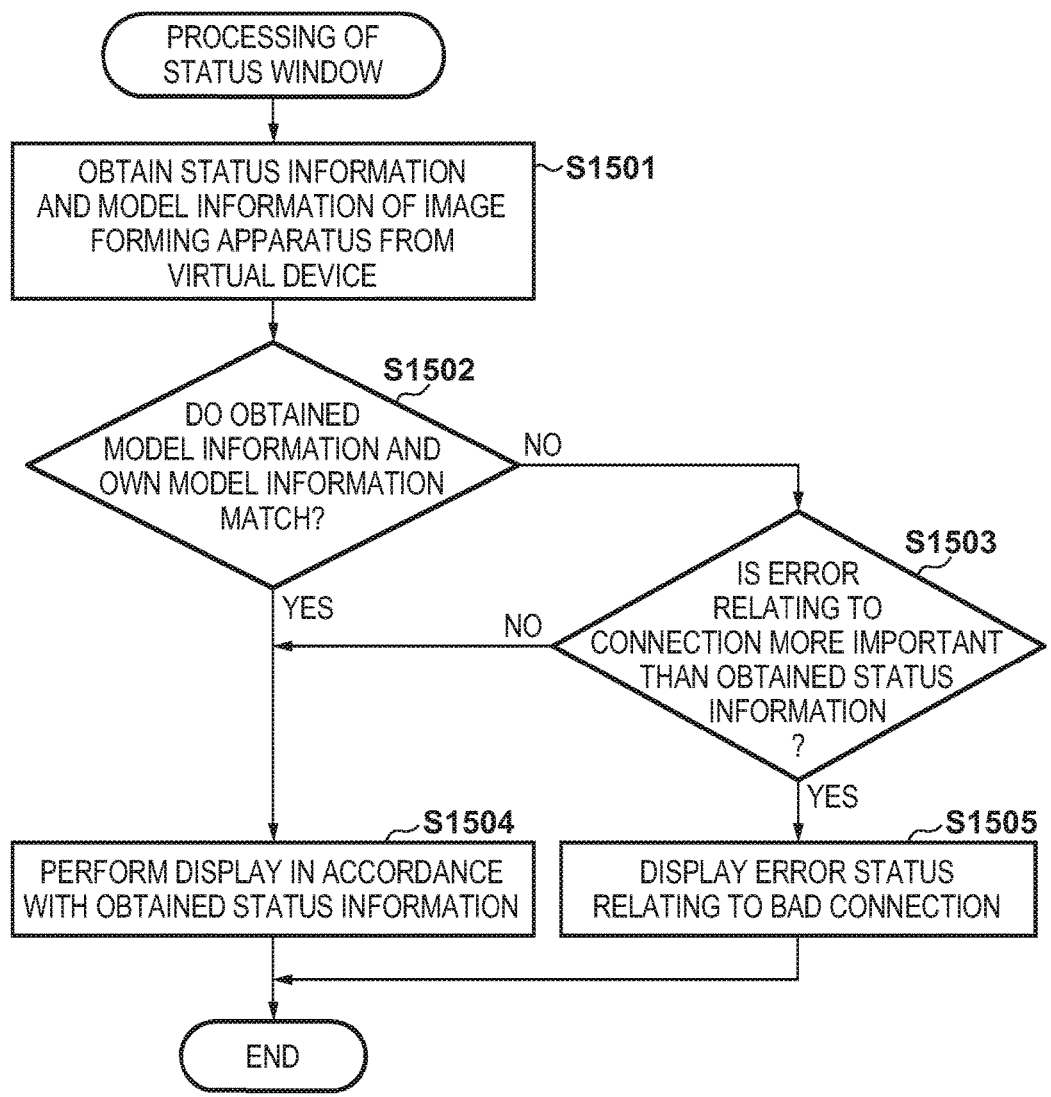

INFORMATION PROCESSING APPARATUS, METHOD OF CONTROLLING THE SAME, PRINT SYSTEM AND STORAGE MEDIUM

This application claims the benefit of Japanese Patent Application No. 2015-166186, filed Aug. 25, 2015, which is hereby incorporated by reference herein in its entirety.

BACKGROUND OF THE INVENTION

Field of the Invention

The present invention relates to an information processing apparatus, a method of controlling an information processing apparatus, a print system, and a storage medium.

Description of the Related Art

For an information processing apparatus to use a peripheral device, such as an image forming apparatus, and the like, it is necessary to embed a device driver (for instance, a printer driver for the case in which the peripheral device is a printer) corresponding to the peripheral device into an operating system (hereafter referred to as OS) that operates on the information processing apparatus. Also, when a printer apparatus, which is a peripheral device, is used, a printer driver is caused to be activated from an application to perform settings required for printing, and image data and print settings (hereafter, these will be collectively called a print job) are generated. Then, the generated print job is transmitted to the printer apparatus. With this arrangement, the printer apparatus that received the print job executes image generation processing (hereafter referred to as rendering) in accordance with the print settings of the print job to print an image on a sheet.

A conventional printer driver includes a user interface module that manages input from a user or an application, a print job generation module that generates the print job, and a communication control module that controls communication between an information processing apparatus and a printer apparatus. Hereafter, the communication control module will be called a language monitor.

A printer driver that includes these module groups is called a Version 3 driver (hereafter referred to as a V3 printer driver). The language monitor accepts a print job generated by the print job generation module and transmits the print job to the printer apparatus via the OS. Also, when a request for cancellation of the print job, or the like, from the user or an application is received, the language monitor controls the print job by performing processing in accordance with the request. Also, there exist V3 drivers that are equipped with a language monitor that extends a language monitor, and can support a protocol for print communication used in not only transmitting a print job from the printer driver, but also receiving, from the printer apparatus, apparatus information of the printer apparatus. By a language monitor that supports such a protocol, even in a case in which a printer apparatus with a small memory capacity is used, it becomes possible to execute stable printing by the printer driver always confirming the memory state of the printer apparatus as information. Also, by a language monitor that supports such a protocol, it is possible for the information processing apparatus to collect, in detail, statuses of the printer apparatus, and to perform management and control of print jobs that would originally have been performed by the printer apparatus. Additionally, systems in which it is possible for applications in the information processing apparatus to display collected statuses of the printer apparatus and messages to a user, input of settings of the printer apparatus, and the like, are widely commercialized and used.

In this way, it is possible to simplify the operation panel of the printer apparatus, and to suppress product costs by performing what would conventionally have been displayed or inputted on a panel of the printer apparatus in an application of the information processing apparatus. Furthermore, systems in which, rather than performing rendering on the printer apparatus, image data that has been rendered by a V3 driver on an information processing apparatus is transmitted to a printer apparatus to cause it to print have been commercialized and used. Such systems are called host-based print systems, and can perform printing equivalent to that of a normal printer apparatus in a printer apparatus in which little memory capacity or a low-spec central processing unit (CPU) is equipped by the function of a language monitor as previously described. In this way, it is possible to suppress the cost of the printer apparatus.

Meanwhile, from Windows 8®, recently introduced by Microsoft Corporation, a printer driver configuration different from the configuration described above has been employed. The foregoing language monitor is not included in the group of modules that configure the printer driver. Also, a communication port that can be used is limited to a Universal Serial Bus (USB) port and a Web Service Device (WSD) port. Such a printer driver is called a Version 4 driver (hereafter referred to as a V4 driver). The V4 driver does not have a language monitor, and so communication processing that transmits, to a printer apparatus, a print job generated by a print job generation module is provided by a spooler equipped as standard on Windows®. Also, processing that a language monitor performs in a V3 driver, such as that in response to a request to cancel a print job from a user or an application, or the like, is executed by this spooler.

In this way, processing that a language monitor performed in the V3 driver conventionally has come to be performed by a spooler in the V4 driver, and thereby there are cases in which control that was possible in the V3 driver ceases to be possible. For example, a case is considered in which, when a printer apparatus and an information processing apparatus are connected via USB, and an error that print processing cannot continue on the printer apparatus occurs, a cancel request in relation to the print job for which the error occurred is issued. In such a case, there are times in which the spooler does not make an instruction to cancel printing to the printer apparatus in relation to the OS. With respect to such a problem, a technique is recited in, for example, Japanese Patent Laid-Open No. 2014-134861, in which a spooler or a command generation filter that is an element of the V4 driver appropriately determines the status of the printer apparatus, and cancels the print job appropriately.

A printer apparatus that can be applied to the foregoing host-based print system is designed with the premise that there is the V3 driver in which a language monitor that supports a protocol for print communication is equipped. Therefore, a request in relation to a print job, such as a print execution request or cancel request, and an operation setting change request from the information processing apparatus to the printer apparatus, and a printer status information notification from the printer apparatus to the information processing apparatus were performed using a protocol for print communication. Furthermore, management of print jobs was performed using the language monitor.

Because there is a restriction that an independent language monitor cannot be embedded in a printer driver in the V4 driver, however, a language monitor that supports a protocol for print communication cannot be embedded into the V4 driver. As a consequence, there is a problem in that a printer apparatus applied to a host-based print system cannot be used to print with the V4 driver.

SUMMARY OF THE INVENTION

An aspect of the present invention is to eliminate the above-mentioned problems with conventional technology.

A feature of the present invention is to provide a technique in which even an information processing apparatus having a driver in which an independent language monitor cannot be embedded is installed can control an image forming apparatus similarly to a conventional V3 driver.

According to a first aspect, the present invention provides an information processing apparatus that is equipped with an OS, and generates a print job from print data accepted from an application by the OS, the apparatus comprising a device service configured to connect to a print apparatus via a port of the information processing apparatus, to accept the print job from the OS and to transmit the print job to the print apparatus, and to accept a control command of the print apparatus from the OS and to transmit the control command to the print apparatus, and a display unit configured to, upon accepting a response from the print apparatus in relation to the control command from the device service, cause a status of the print apparatus to be displayed based on the response.

According to a second aspect, the present invention provides a print system that includes an information processing apparatus and a print apparatus, wherein the information processing apparatus is equipped with an OS, and generates a print job from print data accepted from an application by the OS, the information processing apparatus comprising a device service configured to accept the print job from the OS and to transmit the print job to the print apparatus, and to accept a control command of the print apparatus from the OS and to transmit the control command to the print apparatus, and a display unit configured to, upon accepting a response from the print apparatus in relation to the control command from the device service, cause a status of the print apparatus to be displayed based on the response, and wherein the print apparatus is connected to the device service via a port of the information processing apparatus.

According to a third aspect, the present invention provides a method of controlling an information processing apparatus that is equipped with an OS, and that generates a print job from print data accepted from an application by the OS, the method comprising generating a print job from print data accepted from an application by the OS, executing a device service that connects to a print apparatus via a port of the information processing apparatus, and accepting the print job from the OS, and transmitting the print job to the print apparatus and accepting, for the device service, a control command of the print apparatus from the OS, and transmitting the control command to the print apparatus, wherein when the device service receives a response from the print apparatus in relation to the control command, the device service transmits the response to the OS, and causes a status of the print apparatus to be displayed based on the response.

Further features of the present invention will become apparent from the following description of exemplary embodiments with reference to the attached drawings.

BRIEF DESCRIPTION OF THE DRAWINGS

The accompanying drawings are incorporated in and constitute a part of the specification, illustrate embodiments of the invention, and, together with the description, serve to explain the principles of the invention.

FIG. 6 illustrates an example of a virtual device setting change dialogue that the information processing apparatus displays according to the first embodiment.

FIG. 7 illustrates an example of a virtual device setting dialogue that the information processing apparatus displays according to the first embodiment.

FIG. 12 is a flowchart for describing a print process by the V4 driver that is executed in the information processing apparatus according to the first embodiment.

FIG. 14 is a flowchart for describing a process in which the information processing apparatus determines whether there is no problem with a connection between a virtual device and an image forming apparatus according to the first embodiment.

FIG. 15 is a flowchart for describing a process in which the information processing apparatus determines whether or not an error regarding a connection between a status window and a virtual device is displayed according to the first embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

[First Embodiment]

First, explanation will be given for a first embodiment according to the present invention.

Figure 1:
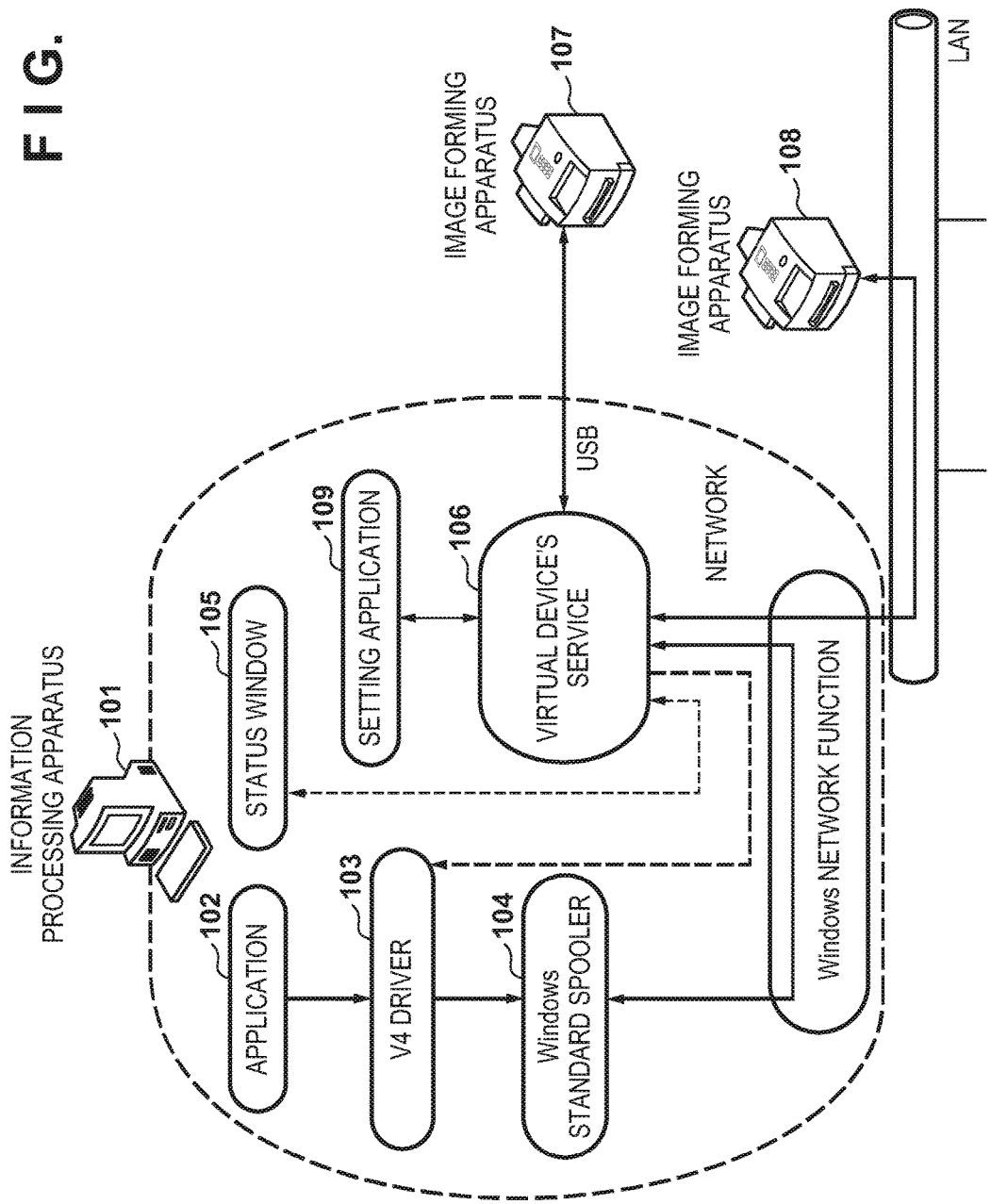
FIG. 1 illustrates an overview configuration of a print system according to a first embodiment of the present invention.

FIG. 1 illustrates an overview configuration of a print system according to the first embodiment of the present invention. In the drawing, thick, solid lined arrow symbols indicate an exchange of a print job, and thin, dashed lined arrow symbols indicate an exchange of data other than a print job.

An application 102 is implemented in an information processing apparatus 101, and is software that is used in accordance with a user's intention, and the user can use the application 102 to instruct a print job. A V4 driver 103 is implemented in the information processing apparatus 101, and, when the V4driver 103 accepts an instruction command for printing from the application 102, the V4 driver 103 creates a print job according to that instruction command. A Windows® standard spooler 104 is a spooler for printing within an OS (that is Microsoft Windows® in the first embodiment) installed on the information processing apparatus 101. The Windows® standard spooler 104 temporarily spools received print jobs and outputs them one by one in the order in which they were received. The Windows® standard spooler 104 transmits the print jobs through a network to a virtual device's service 106. In the first embodiment, the Windows® standard spooler 104 transmits the print jobs by a communication that uses a loopback that transmits data to itself. In this system, the Windows® standard spooler 104 also transmits jobs to the virtual device's service 106.

A status window 105 is software that makes it possible to display a status of image forming apparatuses 107 and 108, to make a particular setting, and the like. The status window 105 holds a Remote Procedure Call (RPC) client function, and this is used to communicate with the virtual device's service 106. The status window 105 makes commands to the virtual device's service 106 to obtain status information and displays the statuses based on the status information accepted as a reply. The status window 105 has model information, and, in the first embodiment, the model information is assumed to be a product name. The virtual device's service 106 is emulator software that behaves like a physical image forming apparatus for the V4 driver 103, the Windows® standard spooler 104, and the status window 105. Communication with the virtual device's service 106 uses a network function on Windows®.

The image forming apparatuses 107 and 108 perform image formation based on received print jobs. The image forming apparatuses 107 and 108 have model information, and, in the first embodiment, this model information is a product name. A setting application 109 is software that performs management and setting of virtual devices 300 and 301 (FIG. 3), described later.

Figure 2:
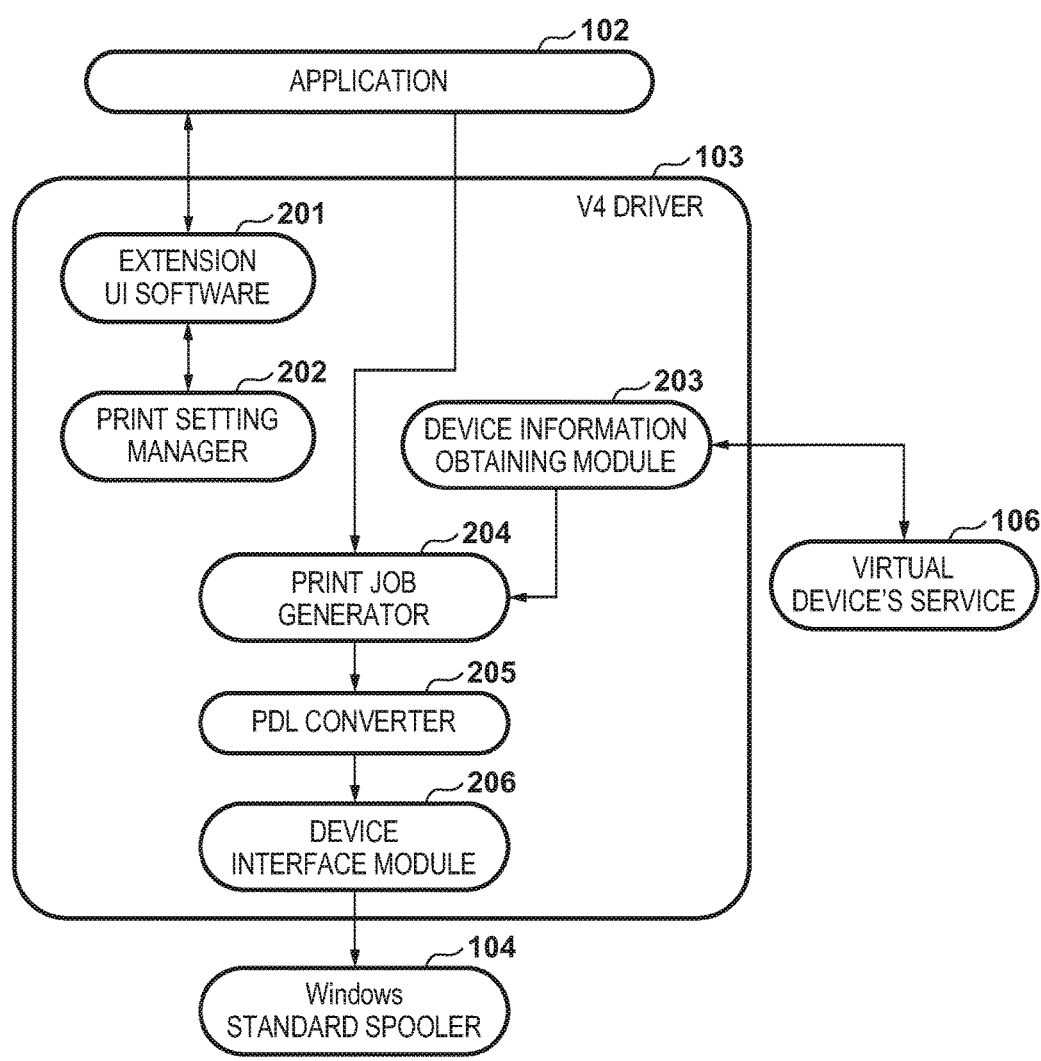
FIG. 2 is a block diagram for describing a software configuration of a V4 driver.

FIG. 2 is a block diagram for describing a software configuration of the V4 driver 103.

In a conventional V3 driver, an OS (including the driver) is called from the application 102 via an application interface (API) that the OS provides, and binary data, which is called a Devmode, is used as data for a print setting.

The application 102, which uses an API that the OS provides, calls a Graphic Device Interface (GDI) to perform rendering. A User Interface (UI) of the V4 driver 103 is a display in a UI with which the OS is equipped, as standard (hereafter referred to as an OS standard UI). It is necessary to install extension UI software 201 (hereafter referred to as extension UI software) for the V4 driver that the OS provides because a UI similar to the V3 driver is used.

In a case in which the user executes the application 102 to perform a print job, a UI of the extension UI software 201 is displayed if the extension UI software 201 is installed, and, if that is not the case, an OS standard UI is displayed. In the first embodiment, although the extension UI software 201 is described as being installed, the extension UI software 201 may also not be installed.

A print setting manager 202 manages print setting items that are displayed on the extension UI software 201 and the OS standard UI, and manages combinations (hereafter referred to as a conflict) of print setting items that cannot be set simultaneously. It is possible that the displayed print setting items or conflicts will change for each image forming apparatus (each model) in accordance with capabilities and functions that the image forming apparatuses 107 and 108 support. The print settings in the V4 driver are managed in a new print setting format that is based on eXtensible Markup Language (XML), appears in place of print settings based on a DEVMODE structure in V3 drivers, and that is called PrintTicket.

A device information obtaining module 203 obtains information of the image forming apparatus that is necessary for generating a print job in a print job generator 204. In the first embodiment, information of each of the image forming apparatuses 107 and 108 is obtained through the virtual device's service 106. The device information obtaining module 203 has an RPC client function, and obtains the information of the image forming apparatuses 107 and 108, respectively, by communicating with RPC servers 311 and 321 (FIG. 3) that the virtual device's service 106 has.

The print job generator 204 performs rendering according to print settings sent from the application 102 and the information of the image forming apparatus obtained from the device information obtaining module 203, and the like, to generate a print job. The print job generator 204 has model information, and, at a time of generating the print job, embeds the model information in the print job. In the first embodiment, the model information is a product name. Also, data that the print job generator 204 accepts is XML Paper Specification (XPS). When the application 102 that uses a Win32 API calls a GDI, the data is automatically converted to XPS within the OS, and then an XPS driver (the V4 driver 103 in the first embodiment) is called. In a case in which printing from a Windows® Presentation Foundation (WPF) application, the XPS driver is called as is.

A page description language (PDL) converter 205 converts the print job into a PDL that corresponds to the image forming apparatus to which to transmit the print job. A device interface module 206 transmits the print job to the Windows® standard spooler 104.

Figure 3:
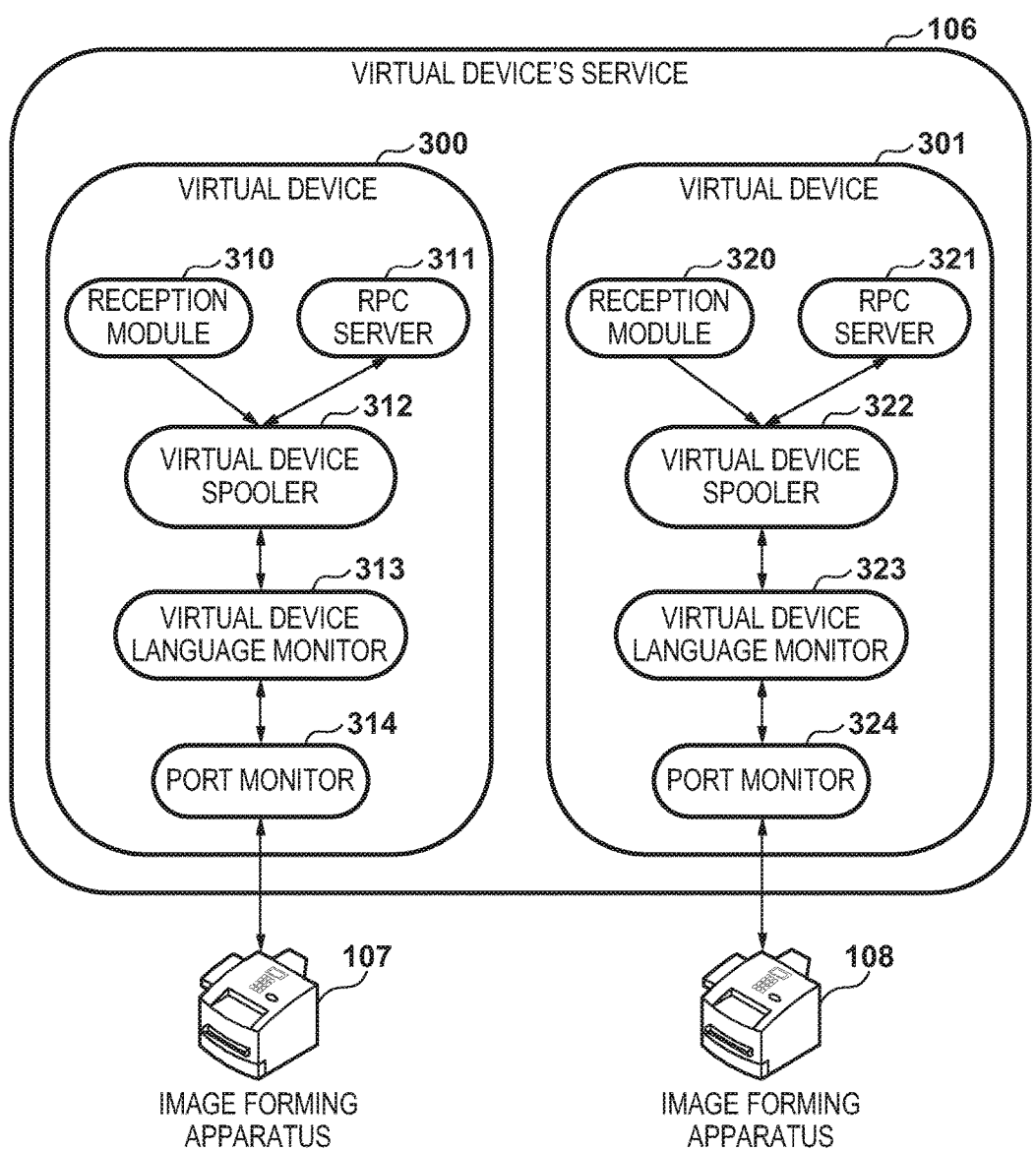
FIG. 3 is a block diagram for describing a software configuration of a virtual device's service according to the first embodiment.

FIG. 3 is a block diagram for describing a software configuration of the virtual device's service 106 according to the first embodiment.

The virtual device's service 106 holds at least one virtual device, and these virtual devices are each connected to a single image forming apparatus. In the first embodiment, the virtual device's service 106 has two virtual devices 300 and 301, and the virtual devices 300 and 301 connect to the image forming apparatus 107 and the image forming apparatus 108 respectively.

The virtual device's service 106 has a function for accepting registration and deletion of a virtual device from an external unit. Also, the virtual device's service 106 requires a designation of a receiving port number (hereafter referred to as a reception port number) that the information processing apparatus 101 has when registering a virtual device by an installer (not shown). Also, the virtual device's service 106 links the designated reception port number and the virtual device to manage them. Also, the virtual device's service 106 has a function for executing a registered virtual device. Execution of the virtual device is performed when the virtual device's service 106 is executed or when a virtual device is newly registered.

A virtual device 300 has a reception module 310, the RPC server 311, a virtual device spooler 312, a virtual device language monitor 313, and a port monitor 314. Also, the virtual device 300 has model information, and, in the first embodiment, the model information is a product name, and the virtual device spooler 312 within the virtual device 300 holds this model information. The reception module 310 delivers to the virtual device spooler 312 a print job accepted from the Windows® standard spooler 104 via the port number linked to the virtual device 300. The RPC server 311, by RPC communication, mediates communication between the virtual device spooler 312 and external modules that have an RPC client function, such as the status window 105, the device information obtaining module 203, or the like.

The virtual device spooler 312 holds a queue that stores print jobs received from the reception module 310, and performs management of print jobs and transmission to the virtual device language monitor 313. Also, the virtual device spooler 312 provides various access functions for obtainment of print job information, deletion of a print job, or the like in relation to the managed print jobs. The access function is used by the virtual device language monitor 313 and the setting application 109. Also, the virtual device spooler 312 performs reception of various commands and replies to the commands via the RPC server 311. Also, the virtual device spooler 312 performs transmission of various commands to the virtual device language monitor 313 and acceptance of replies to the commands. In the first embodiment, the virtual device spooler 312 is something that holds a product name as model information of the virtual device 300 that belongs to itself.

The virtual device language monitor 313 is a module that performs management of various information and control of print jobs, and that transmits print jobs received from the virtual device spooler 312 to the image forming apparatus 107 via the port monitor 314. Also, the virtual device language monitor 313 performs transmission of various commands to the image forming apparatus 107 and obtainment of information from the image forming apparatus 107 via the port monitor 314. In the first embodiment, the virtual device language monitor 313 obtains print statuses, various statuses, and setting information, error information, and the like, of the image forming apparatus 107. Also, when the image forming apparatus 107 is connected, the virtual device language monitor 313 obtains the product name thereof. Also, the virtual device language monitor 313 performs determination of statuses of the image forming apparatus 107 based on information obtained from the image forming apparatus 107 and information it holds itself. Then, if an error status is determined, error processing is performed, such as stopping the print process. Also, the virtual device language monitor 313 performs reception of the various commands from the virtual device spooler 312 and replies to the commands. For example, if a command for obtaining status information is accepted from the status window 105 via the virtual device spooler 312, model information and status information that is based on the foregoing status determination are replied. The port monitor 314 performs mediation of the communication between the virtual device language monitor 313 and a port of the information processing apparatus 101 connected to the image forming apparatus 107. There are cases in which the communication that the image forming apparatus 107 can handle differs for every model, and communication processing specialized to each image forming apparatus 107 is performed.

A virtual device 301 is connected to the image forming apparatus 108 via a port other than that of the virtual device 300 among the ports that the information processing apparatus 101 has. The virtual device 301 has a reception module 320, an RPC server 321, a virtual device spooler 322, a virtual device language monitor 323, and a port monitor 324. The configuration of the virtual device 301 is the same as the virtual device 300 so a detailed description is omitted.

Figure 4:
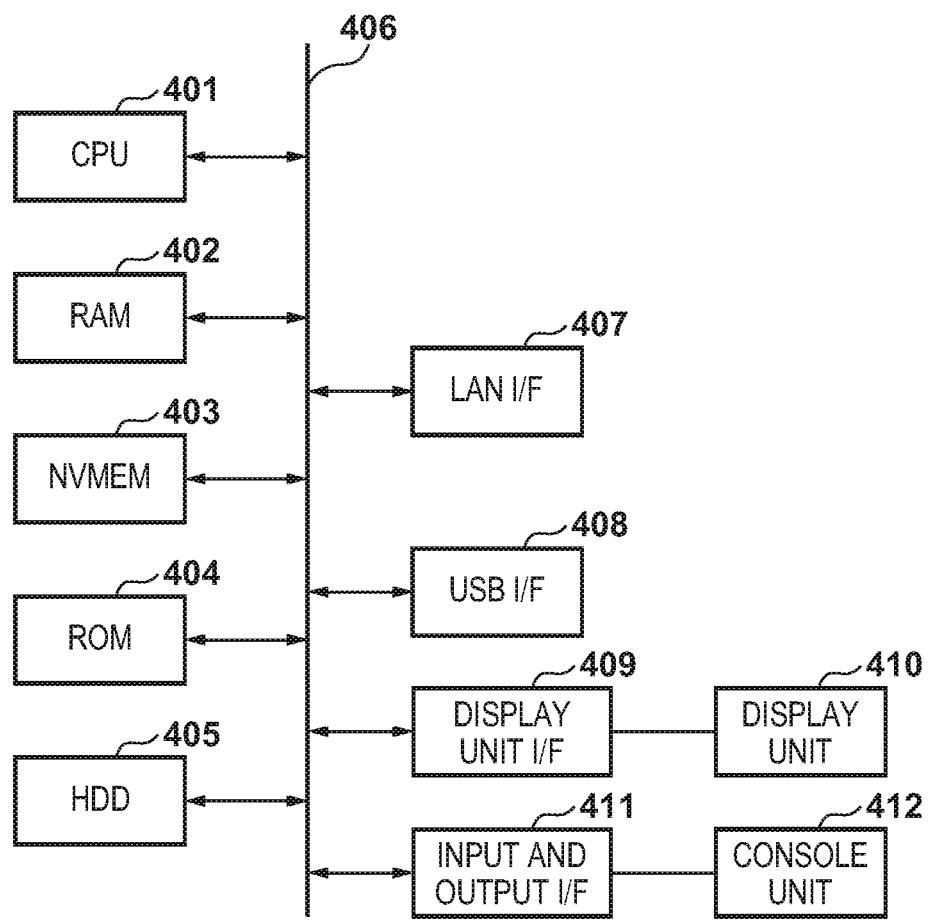
FIG. 4 is a block diagram for describing a hardware configuration of an information processing apparatus according to the first embodiment.

FIG. 4 is a block diagram for describing a hardware configuration of the information processing apparatus 101 according to the first embodiment.

A CPU 401 is a processor that controls the entirety of the information processing apparatus 101. A random access memory (RAM) 402 is a system work memory for the CPU 401 to operate, and is used as a program memory for recording programs. A non-volatile memory (NVMEM) 403 records setting information, and the like. A read-only memory (ROM) 404 is a non-rewritable, non-volatile memory, and records various programs. A hard disk drive (HDD) 405 stores an OS, programs, and the like. A USB interface (I/F) 408 is a functional unit for connecting to USB devices, and is used for obtaining statuses of other devices via USB and for returning statuses. A local area network (LAN) I/F 407 is a functional unit for connecting to a LAN, and is used for obtaining statuses of other devices via the LAN and for returning statuses. A display unit I/F 409 controls an interface between a display unit 410 and the CPU 401. An input output I/F 411 controls an interface between a console unit 412, which includes a pointing device, and the like, and a keyboard for example. The devices described above are arranged on a system bus 406. The CPU 401 executes a boot program stored in the ROM 404 to deploy an OS, programs, and the like, that are installed in the HDD 405 into the RAM 402, and, by execution of the OS, programs, and the like, executes processing according to the information processing apparatus 101 described later. Note, the display unit 410 may also be equipped with a touch panel function.

Figure 5:
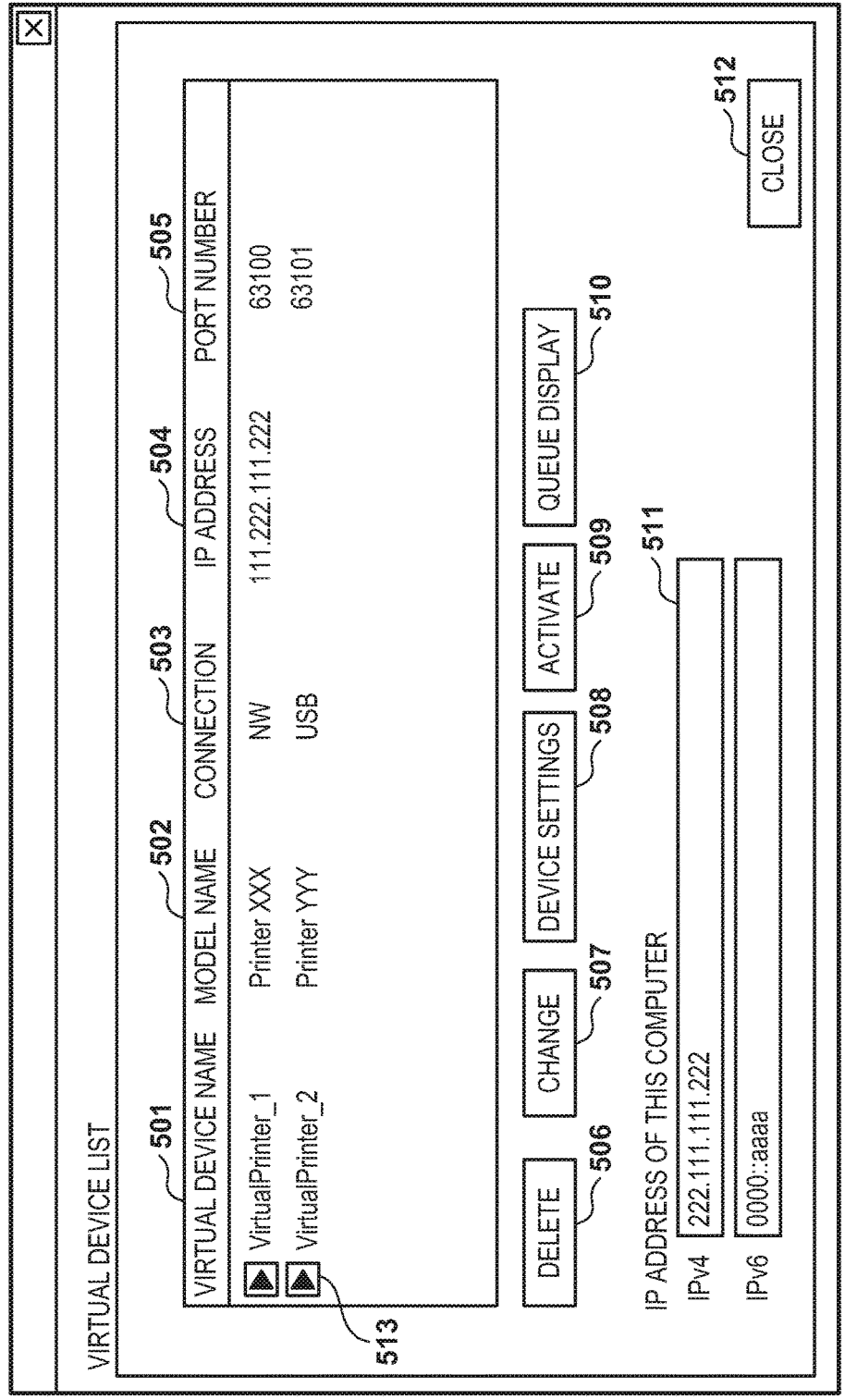
FIG. 5 illustrates an example of a screen that a setting application of the information processing apparatus displays on a display unit according to the first embodiment.

FIG. 5 depicts a view illustrating an example of a screen that the setting application 109 of the information processing apparatus 101 displays on the display unit 410 according to the first embodiment.

A TOP screen 500 of the setting application 109 displays an operational status or information of virtual devices installed on the information processing apparatus 101, and additionally has functions for changing information that a virtual device has, deleting a virtual device, and the like. This makes use of access functions that virtual device spoolers 312 and 322 provide. A virtual device name 501 displays a name of a virtual device installed on the information processing apparatus 101. A model name 502 indicates names by which the image forming apparatuses 107 and 108, which are linked to the virtual devices 300 and 301, respectively, can be specified. Product names are displayed in the first embodiment. A connection 503 indicates a state of connection with the image forming apparatuses 107 and 108, a network connection (NW) indicates a connection via a network, and USB indicates a connection via USB. In a case in which the connection with the image forming apparatuses 107 and 108 in the connection 503 is an NW, an internet protocol (IP) address 504 indicates the IP addresses of the image forming apparatuses. When a job is received, a port number 505 indicates a reception port number that is assigned to the virtual device.

On the screen, if a user selects a virtual device from a list of virtual devices and presses a deletion button 506, a confirmation message is displayed (not shown), and, if consent of the user is obtained, the selected virtual device is deleted. Also, if the user selects a virtual device and presses a change button 507, a dialog by which it is possible to change the virtual device name 501 of the selected virtual device, the IP addresses of the image forming apparatuses 107 and 108, and the linked reception port number is displayed. Also, when the user selects a virtual device, and a device settings button 508 is pressed, a dialog by which settings regarding saving of logs of the virtual device that is selected, or settings regarding a time notification are possible is displayed. Also, when the user selects a virtual device and presses an activation button 509, the status window 105 for the virtual device that is selected is activated. Furthermore, when the user selects a virtual device and presses a queue display button 510, information regarding a print job that the virtual device spooler 312 of the selected virtual device manages is displayed.

The IP address of the information processing apparatus 101 is displayed in an IP address display area 511. When the user presses a close button 512, the application is terminated. Also, an icon 513 is an icon, which indicates whether the virtual device is operating or is stopped is displayed at the head of the virtual device name.

FIG. 6 depicts a view illustrating an example of a virtual device setting change dialogue 600 that the information processing apparatus 101 displays according to the first embodiment. This screen is displayed by the user selecting a virtual device from a list of virtual devices on the screen of FIG. 5 and pressing the change button 507.

A connected printer 601 indicates the product names of the image forming apparatuses 107 or 108 linked to the selected virtual device. A destination 602 indicates a destination to which to output a job for the selected virtual device. If a connection to an image forming apparatus is NW, the destination 602 becomes the IP address of the image forming apparatus. Also, if the connection to an image forming apparatus is a USB connection, the destination (control) 602 becomes hidden. A virtual device name 603 is a title displayed in the virtual device name 501 displayed on the TOP screen 500 of FIG. 5. A reception port number 604 indicates the reception port number described previously. In FIG. 6, in a case in which the virtual device name of FIG. 5 is "VirtualPrinter_1" is selected and the change button 507 is pressed, the IP address and the reception port number correspond to FIG. 5. Note, the virtual device name "VirtualPrinter_1" corresponds to the image forming apparatus 108 here.

Here, if the user changes the IP address of the image forming apparatus, it becomes possible to output to the same image forming apparatus by changing the IP address of the destination 602. Also, even if it is desired to output to another image forming apparatus of the same model, the user can change the output destination of the job by changing the IP address of the destination 602. In this way, after a user has edited desired items via the screen, when an OK button 605 is pressed, settings on the screen are reflected and the virtual device setting change dialogue 600 closes. Also, when the user presses a cancel button 606, editing contents on the screen are discarded and the virtual device setting change dialogue 600 closes.

FIG. 7 depicts a view illustrating an example of a virtual device settings dialogue 700 that the information processing apparatus 101 displays according to the first embodiment. This screen is displayed by the user selecting a virtual device on the screen of FIG. 5 and pressing the device settings button 508. FIG. 7 illustrates a case in which the virtual device name "VirtualPrinter_1" of FIG. 5 is selected and the device settings button 508 is pressed.

When the user selects a radio button 701 "save printer logs" on the screen, log information within the image forming apparatus 108 linked to the virtual device is retrieved from the information processing apparatus 101, and is saved in a file designated in a saving destination 706. Also, when a user selects a radio button 702 "save computer logs", in the information processing apparatus 101, a record of communication with the image forming apparatus 108 and the like, and a log processed in the information processing apparatus 101 is saved in a file designated in a saving destination 707. Also, when the user selects a radio button 703 "notify time to printer", the time of the information processing apparatus 101 is notified to the image forming apparatus 108 at regular intervals. When an OK button 704 is pressed, the editing contents on the screen are reflected and the virtual device settings dialogue 700 closes. Also, when the user presses a cancel button 705, editing contents on the screen are discarded and the virtual device settings dialogue 700 closes.

Figure 8:
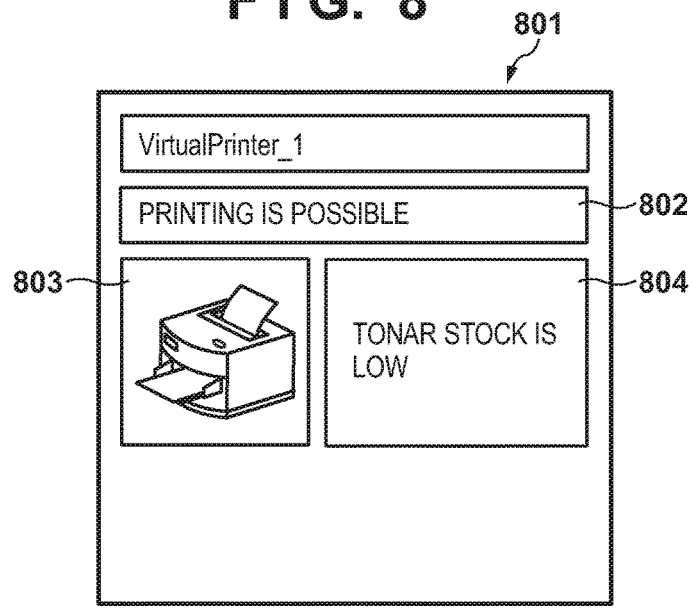
FIG. 8 illustrates an example of a status display screen that is displayed by a status window of the information processing apparatus according to the first embodiment.

FIG. 8 depicts a view illustrating an example of a status display screen that is displayed by the status window 105 of the information processing apparatus 101 according to the first embodiment. Regarding this screen, by the user selecting the virtual device name is "VirtualPrinter_1" on the screen of FIG. 5 and pressing the activation button 509, the status window 105 is activated and displayed.

A status window TOP screen 801 switches contents of a status screen 803 and a main message 802 in accordance with the contents of the status of the virtual device that is selected. A supplementary message 804 displays supplementary information of the status and the like. In FIG. 8, a message indicating that toner of the image forming apparatus 108 (VirtualPrinter_1) connected via the network is low is displayed.

Figure 9:
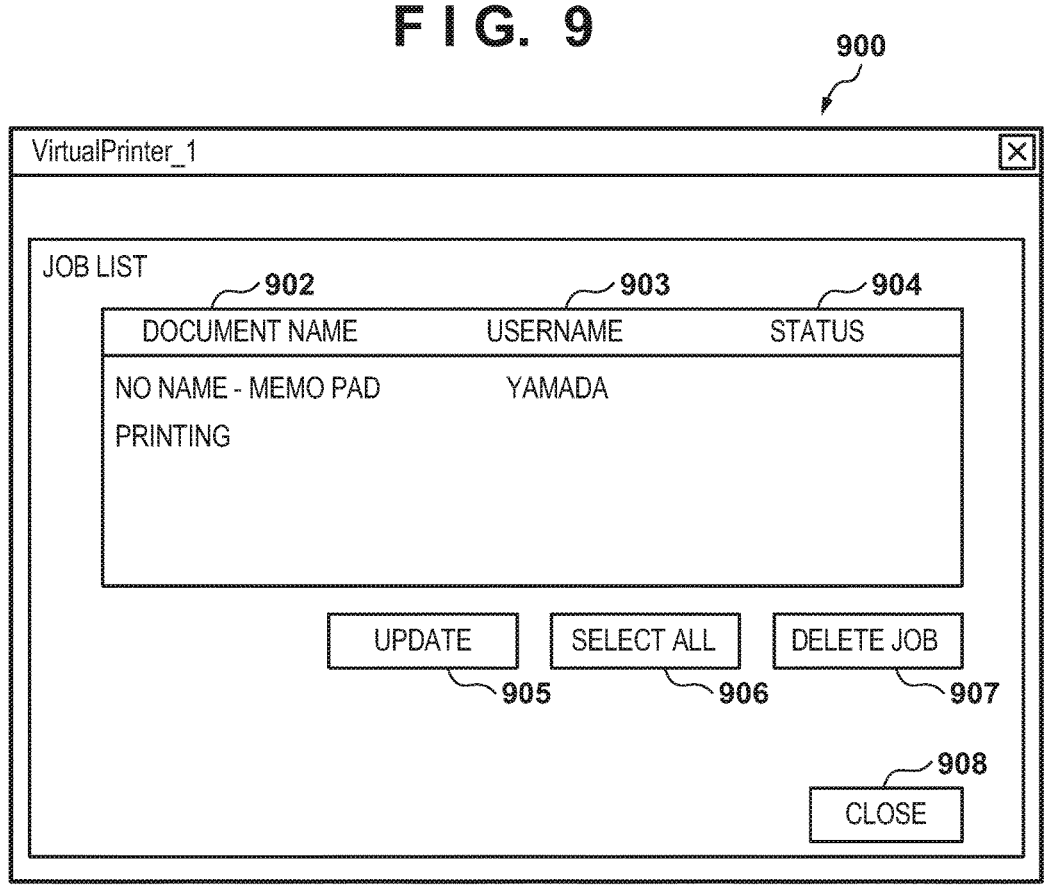
FIG. 9 illustrates an example of a job list dialogue that the information processing apparatus displays according to the first embodiment.

FIG. 9 depicts a view illustrating an example of a job list dialogue 900 that the information processing apparatus 101 displays according to the first embodiment. This screen illustrates an example of a job list dialogue that the virtual device spooler 312 (322) manages, and that is activated by a user pressing the queue display button 510 on the screen of FIG. 5.

A document name 902 displays a currently processing document name 902. A username 903 displays the name of a user who executed the job. A status 904 indicates a status of the job, such as printing, on standby, or the like. When the user presses an update button 905 on the screen, a displayed job list is updated to a latest state. Also, when the user presses a select-all button 906, all jobs displayed in the job list are made to be a selected status. When the user selects a job on the job list and presses a job delete button 907, the selected job is deleted. When the user presses a close button 908, the job list dialogue 900 closes.

Figure 10:
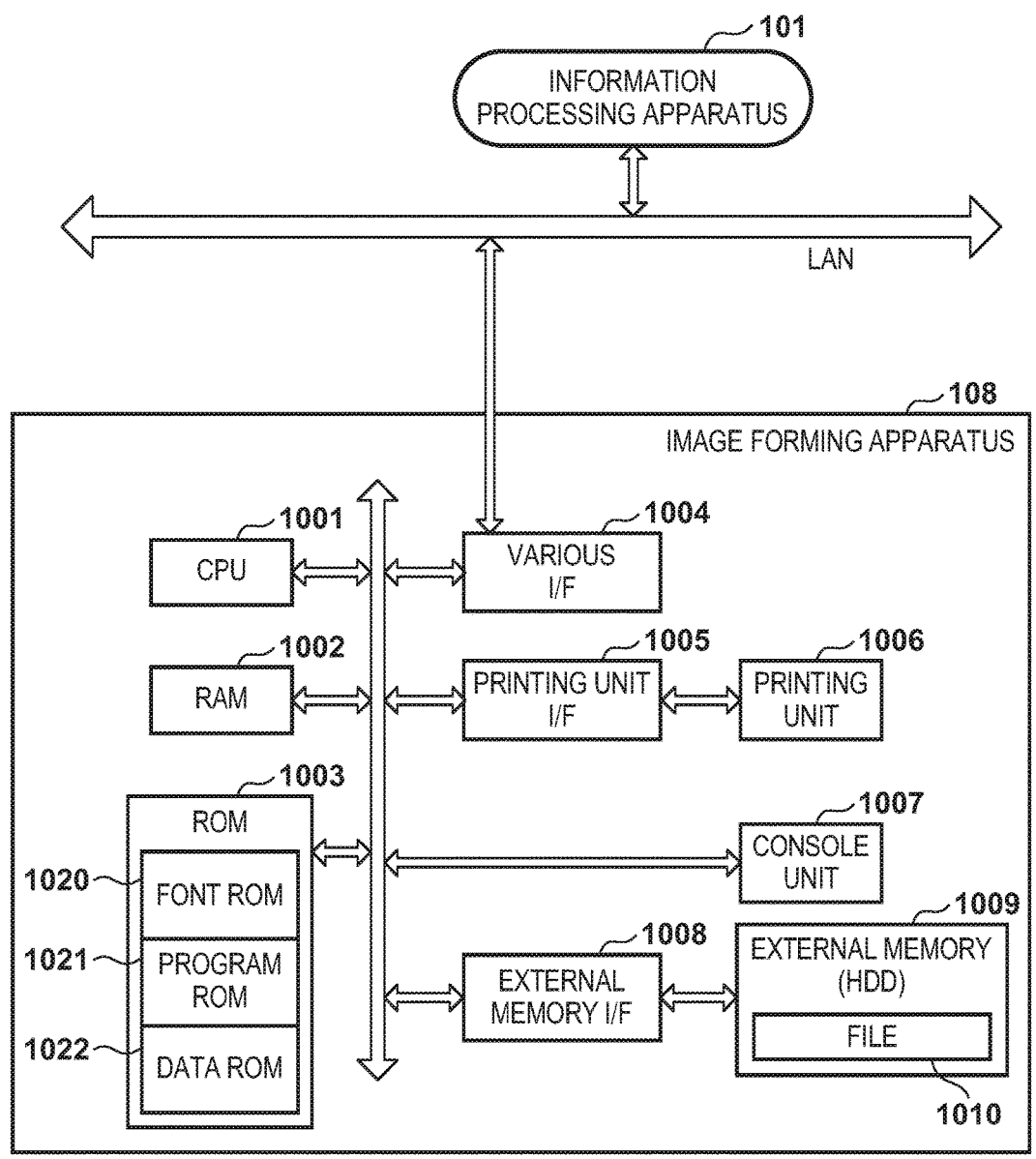
FIG. 10 is a block diagram for describing a hardware configuration of an image forming apparatus according to the first embodiment.

FIG. 10 is a block diagram for describing a hardware configuration of the image forming apparatus 108 according to the first embodiment. Here, although description is given with reference to the image forming apparatus 108 that is connected via the network, description of the configuration of the image forming apparatus 107 is omitted here because the configuration of the image forming apparatus 107 is basically the same.

A CPU 1001 controls all operations of the image forming apparatus 108. A RAM 1002 functions as the main memory of the CPU 1001, a work area, and the like as well as also being used as a loading region for output information, and a storage region for environment data. Also, the RAM 1002 comprises an non-volatile RAM (NVRAM) area, and is configured such that the memory capacity can be extended by an option RAM connected to a socket for extension (not shown). A ROM 1003 includes a font ROM 1020 that stores various fonts, a program ROM 1021 that stores control programs, and, the like executed by the CPU 1001, and a data ROM 1022 that stores various data. Various I/Fs (mainly network and a USB I/F, the figure is the case of network) 1004 perform transmission and reception of data with the information processing apparatus 101. A printing unit I/F 1005 controls an interface with a printing unit 1006 that is a printer engine. An external memory 1009 includes a Solid State Disk (SSD), a hard disk (HD) connected as an option, or the like, in which access is controlled by an external memory I/F 1008. The external memory 1009 stores font data, form data, and the like. Furthermore, a file 1010, which is for an exchange performed with an external unit, can be temporarily created in the image forming apparatus 108, and stored.

Note, in a case in which the external memory 1009, which may be a hard disk, is not connected, information used in the information processing apparatus 101, and the like, is stored in the data ROM 1022 of the ROM 1003. Note, the external memory 1009 is not limited to just one, memory, and may comprise a plurality of external memories. For example, a configuration may be taken such that external memories that store programs, and the like, that interpret printer control languages of different language systems and option font cards are plurally connected in addition to embedded fonts. In a console unit 1007, an operation panel of a touch panel structure that accepts operations by the user is arranged, and further, in the operation panel, a switch for operation, a display device, and the like, are arranged (not shown). Also, a configuration may be taken such that an NVRAM is included (not shown), and printer mode setting information from the operation panel is stored.

The CPU 1001 outputs image signals as output information to the printing unit 1006 via the printing unit I/F 1005 based on control programs, and the like, stored in the program ROM 1021 of the ROM 1003. Also, the CPU 1001 can perform communication with the information processing apparatus 101 via various I/Fs (network or a USB I/F are the main ones) 1004. Then, when a print job that is transmitted from the information processing apparatus 101 is received, a bi-directional communication path by which information and the like of the image forming apparatus 108 can be notified to the information processing apparatus 101 is configured.

Figure 11:
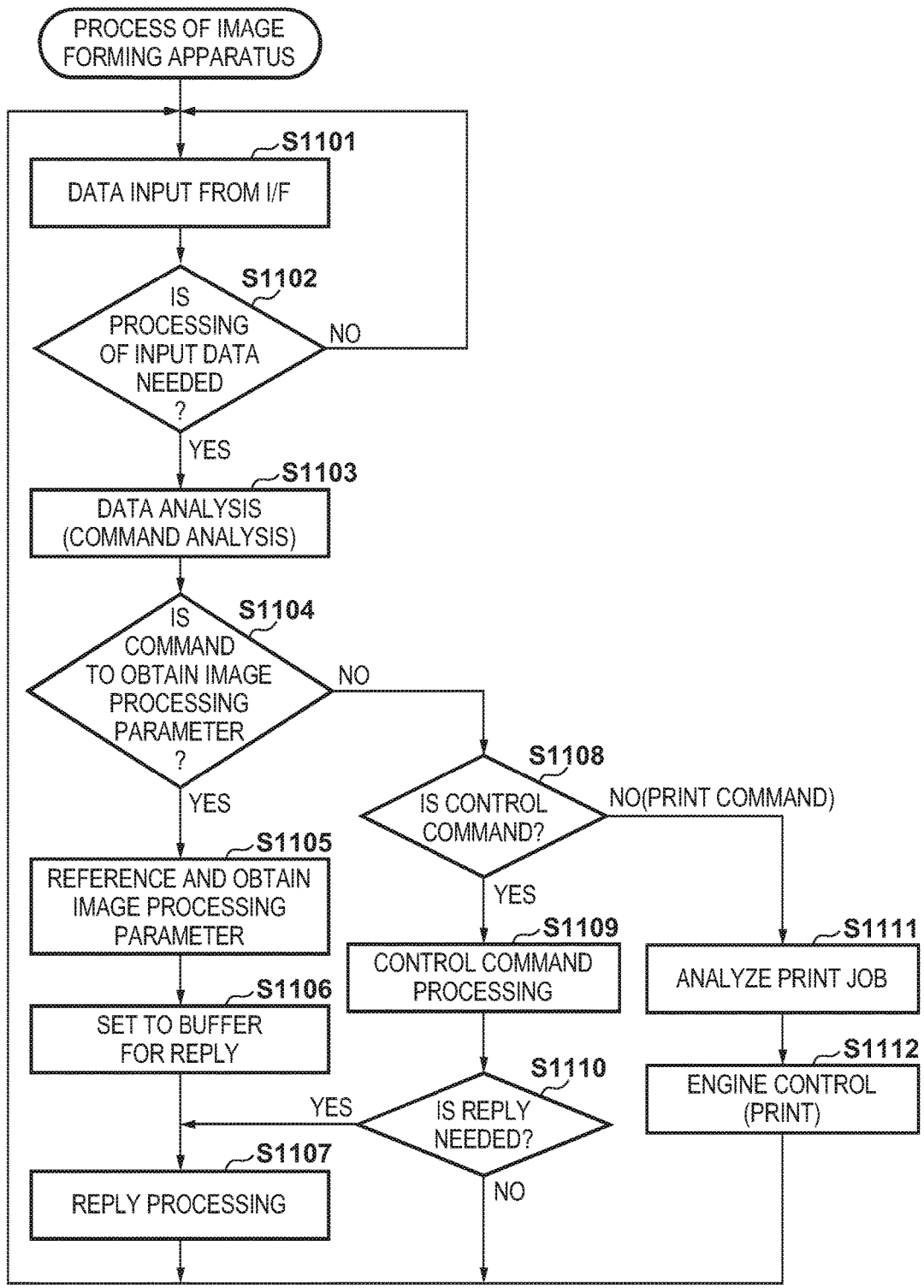
FIG. 11 is a flowchart for describing a print process by the image forming apparatus according to the first embodiment.

FIG. 11 is a flowchart for describing a print process by the image forming apparatus 108 according to the first embodiment. Note, processing illustrated in this flowchart is realized by a program that executes the processing being stored in the program ROM 1021 of the ROM 1003, and the CPU 1001 reading out and executing the program.

First, when data is received from the information processing apparatus 101 on which the virtual device's service 106 operates, the CPU 1001 in step S1101 advances processing to step S1102, and determines whether or not the data processing is necessary. When the CPU 1001 in step S1102 determines that the data processing is necessary, processing proceeds to step S1103. When the CPU 1001 does not determine that the data processing is necessary, however, processing proceeds to step S1101 and waiting for reception of the data continues. Here, in a case in which the data has no meaning, a configuration may be taken such that the data is read and discarded. Note that here, the received data is assumed to be of a command format that the image forming apparatus 108 can recognize.

The CPU 1001 in step S1103 analyzes commands of the received data and performs processing according to the analysis result. Next, the processing proceeds to step S1104 and the CPU 1001 determines whether or not the data is a command to obtain an image processing parameter, and, if so, the processing proceeds to step S1105, and an image processing parameter for image correction that the image forming apparatus 108 has is obtained. Then, the processing proceeds to step S1106 and the CPU 1001 sets the obtained parameter in a buffer for replying that is for replying to an obtain command. Then, the processing proceeds to step S1107 and the CPU 1001 executes reply processing that replies with the parameter that was set in the buffer for replying and advances processing to await data reception of step S1101.

Meanwhile, when the CPU 1001 in step S1104 determines that it is not a command to obtain the image processing parameter, the processing proceeds to step S1108. The CPU 1001 in step S1108 determines whether or not the data is a control command (reference of a setting the apparatus, execution of a setting, reference of a status, or the like) for controlling the image forming apparatus, and if so the processing proceeds to step S1109. The CPU 1001 in step S1109 determines the control command, and executes processing according to the control command, and the processing proceeds to step S1110. In step S1110 the CPU 1001 determines whether or not a reply to the control command is necessary, and, when a reply is determined to be necessary, processing proceeds to step S1107, and reply processing is executed and the processing proceeds to step S1101. Also, in step S1110 when the reply is determined to be unnecessary, the processing proceeds to step S1101 as is.

Also, in step S1108, when it is determined not to be the control command, the processing proceeds to step S1111, and in such a case, it is determined that a print job (including a print command) is received, and analysis of the print job is performed. Then, the processing proceeds to step S1112 and the CPU 1001 controls the printing unit 1006 of the image forming apparatus 108 and executes print processing. Thus, when the print process is terminated, and processing advances to awaiting data reception in step S1101.

Next, explanation is given, with reference to the foregoing FIG. 1 through FIG. 3, of a flow of data in a case in which printing is performed using the print system according to the first embodiment.

When an initiation of a print job is instructed from the application 102 that the user uses in the information processing apparatus 101, the V4 driver 103 is called and a print job is created. At a time of a creation of the print job, a dynamic image processing parameter of the image forming apparatus 108 is used. Here, the device information obtaining module 203 of FIG. 2 receives information from the image forming apparatus 108 through the virtual device's service 106. In addition to this information, the print job generator 204 generates the print job, and furthermore, the PDL converter 205 converts it into a print job of a PDL format. Then, the print job is passed to the Windows® standard spooler 104 of Windows® that operates on the information processing apparatus 101. The print job on the Windows® standard spooler 104 passes through a standard port monitor in a Windows® network function and is transmitted to the reception module 320 of the virtual device 301 of the virtual device's service 106 by the Windows® network function. The reception module 320 of the virtual device 301 receives the print job via the network and stores it in a queue that the virtual device spooler 322 within the virtual device 301 has. While the virtual device spooler 322 performs an exchange with the virtual device language monitor 323, the virtual device spooler 322 transmits the print job stored in the queue to the image forming apparatus 108 via the port monitor 324 of the virtual device 301. The virtual device spooler 322 accepts status information of the image forming apparatus 108 by bidirectional communication simultaneously with the transmission of the print job, and performs reception of the various commands and replies to the commands via the RPC server 321.

The status window 105 exchanges with the virtual device's service 106 via the Windows® network function and performs a display of the status of the image forming apparatus 108, editing of setting items of the image forming apparatus 108, or the like.

FIG. 12 is a flowchart for describing a print process by the V4 driver 103 that is executed in the information processing apparatus 101 according to the first embodiment. Note, this processing is achieved by the CPU 401 of the information processing apparatus 101 deploying a program stored in the HDD 405 into the RAM 402 and executing the program. Note that here, the print process is described in a case in which the image forming apparatus 108 is used to print.

The CPU 401 that executes the V4 driver 103 executes the initialization process in step S1201 and obtains the image processing parameter for image processing that exists in the image forming apparatus 108. This image processing parameter is a necessary image processing parameter in subsequent image rendering processing. In the obtainment processing, the device information obtaining module 203 in the V4 driver 103 of FIG. 2, communicates with the RPC server 321 of the virtual device's service 106 of FIG. 3 to obtain the image processing parameter from the image forming apparatus 108. In other words, a reception of the results of a response that is made in step S1311 and step S1312 in FIG. 13B, explained later, is performed. Here, although there is a possibility of a problem in a correction of the image data appearing, or the like, in a case in which the image processing parameter could not be obtained from the image forming apparatus 108, the image rendering processing is continued using a stipulated value in such a case.

Next, the CPU 401 in step S1202 and step S1203, awaits input of the print job from the application 102. Here, when a print job is input, the processing proceeds to step S1204 and message data from the virtual device's service 106 of a subsequent stage is input. This message data from a subsequent stage is a message, or the like, that indicates completion of reception of the print job from the image forming apparatus 108. Then, the processing proceeds to step S1205 and the CPU 401 determines whether or not message data that should be processed is accepted, and when the message data that should be processed is not received, the processing proceeds to step S1208. When it is determined in step S1205 that the message data that should be processed is accepted, the processing proceeds to step S1206, and processing for the display, or the like, according to the message type is performed (details of the message type are omitted). One such message type is "terminate print process" and, in this case processing termination is determined in step S1207 and the processing terminates. Note, when termination of the print process is determined in step S1207, such as in a case of an abnormal termination, or the like, the processing is terminated.

When no termination of the print process is determined in step S1207, the processing proceeds to step S1208 and it is determined whether or not processing of the received print job is necessary. Here, when it is determined that the processing is not necessary, the processing returns to step S1202 in order to further accept data from the application 102. When the CPU 401 in step S1208 determines that the processing of the print job is necessary, the processing proceeds to step S1209, and the parameter for image correction obtained in step S1201 is used to perform rendering processing. Next, the processing proceeds to step S1210 and the CPU 401 saves the print job that includes the print data obtained by the rendering processing to the Windows® standard spooler 104. Then, the processing proceeds to step S1211 and the CPU 401 converts the print job to a print data format that the image forming apparatus 108, which actually performs the print job, is available. Here, the data conversion is executed on the Windows® standard spooler 104. Then, the processing proceeds to step S1212 and the CPU 401 saves the converted print job to the Windows® standard spooler 104. Then, the processing proceeds to step S1213 and the CPU 401 requests transmission of the print job to a Windows® standard port monitor (not shown) in the Windows® network function, and the print job is transmitted to the virtual device's service 106. In this way, when transmission of the print job is terminated, the processing returns to step S1205 in order to further transmit the next print job, and the message processing, rendering processing, data conversion processing, and data transmission processing, all described previously, are executed.

Note, in this flowchart, after termination of the print process is determined in step S1207, although the print processing is terminated, a transition may be performed to the wait for the next print job of step S1201 rather than terminating the print processing.

Figure 13A:
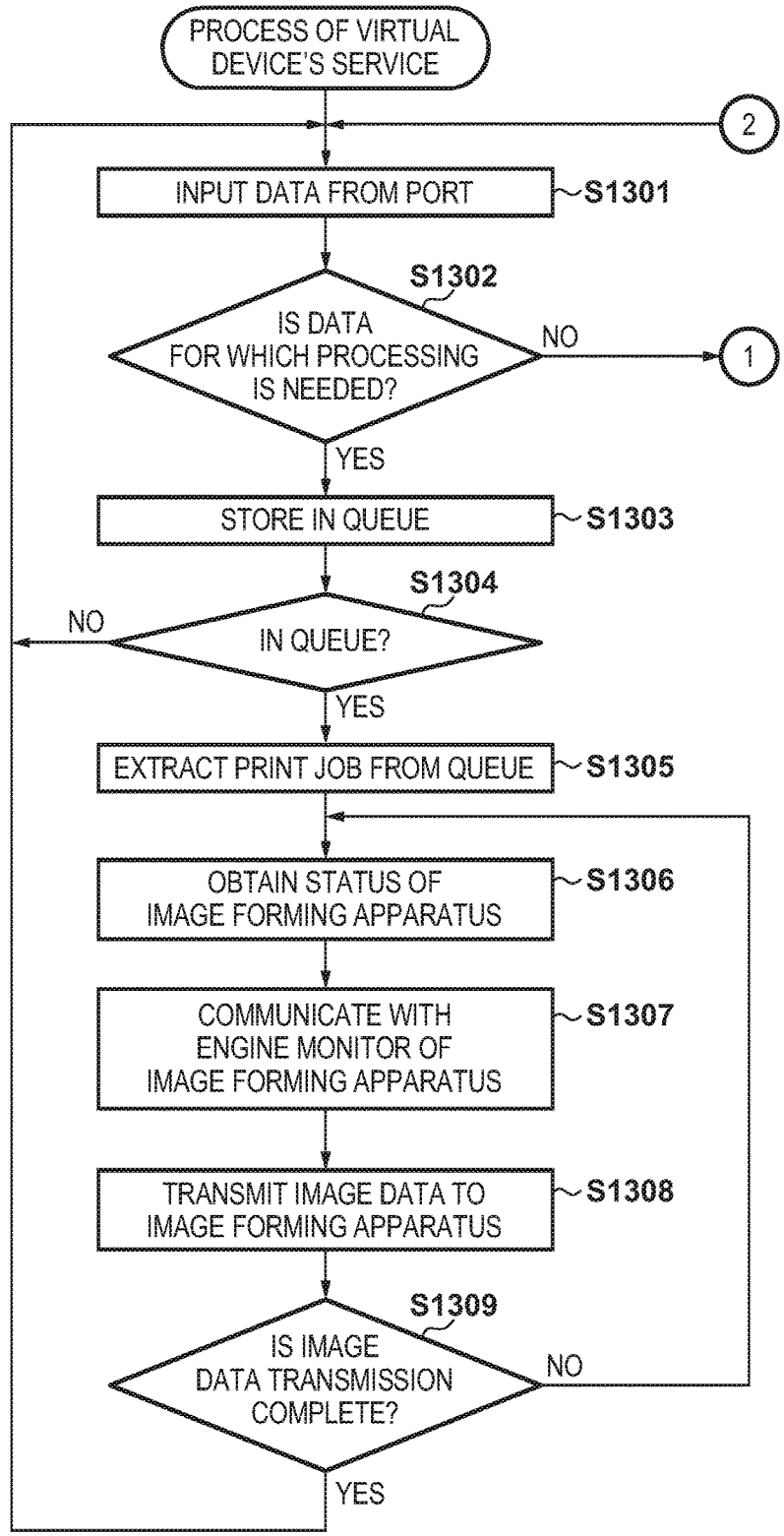
FIGS. 13A and 13B are flowcharts for describing an example of a process by the virtual device's service of the information processing apparatus according to the first embodiment.
Figure 13B:
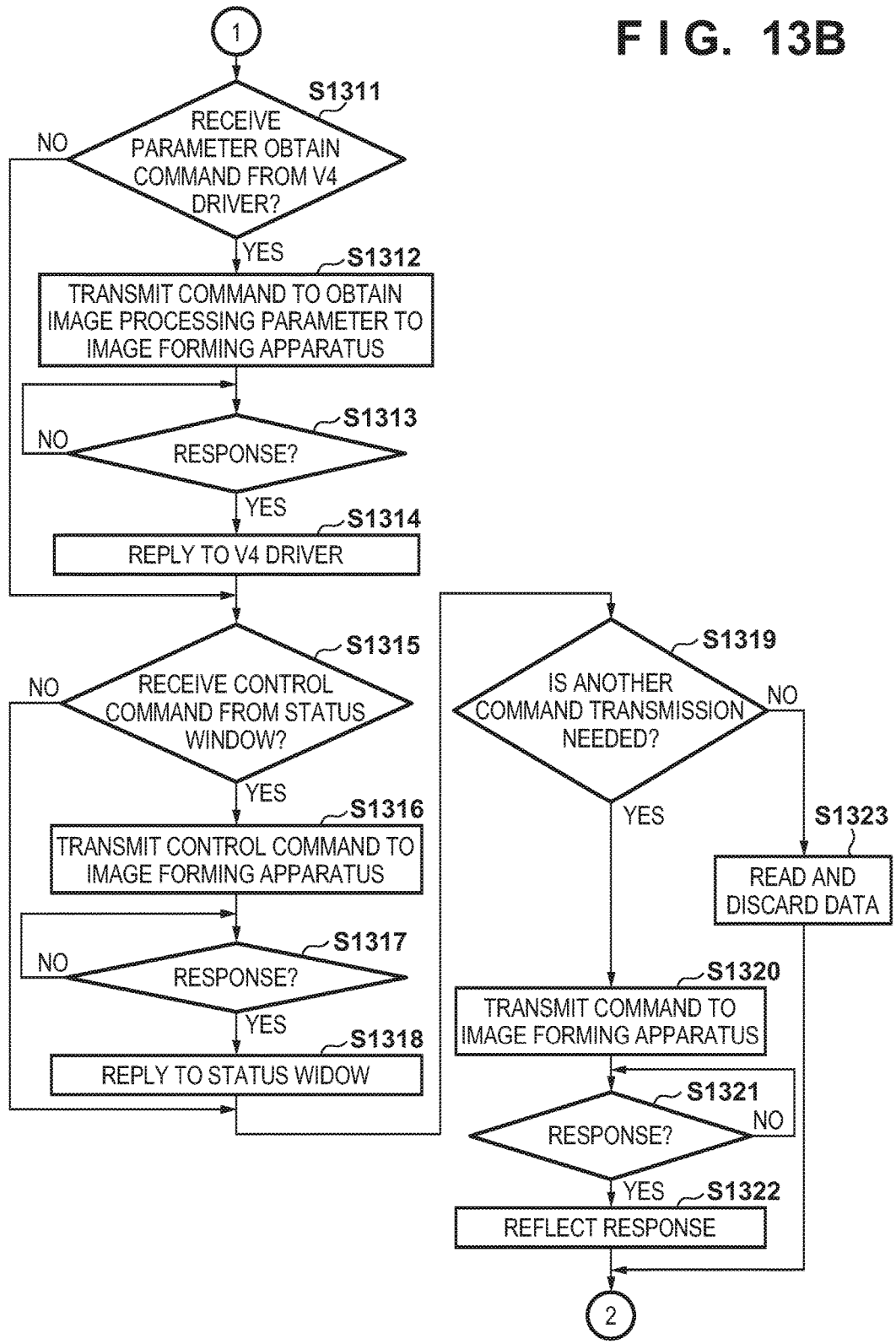

FIGS. 13A and 13B are flowcharts describing an example of a process by the virtual device's service 106 of the information processing apparatus 101 according to the first embodiment. Note, this processing is achieved by the CPU 401 of the information processing apparatus 101 deploying a program stored in the HDD 405 into the RAM 402 and executing the program. In the first embodiment, explanation will be given for a case of the virtual device 301 corresponding to the image forming apparatus 108.

First, the CPU 401 in step S1301 functions as the reception module 320 of the virtual device 301 and inputs data from the reception port. More specifically, the reception module 320 inputs data from a port of the Windows® network function. Next, the processing proceeds to step S1302 and the CPU 401 determines whether or not data (print job) for which processing is necessary is input, and if so, the processing proceeds to step S1303, and the input data is stored in the queue of the virtual device spooler 322. Here, although not shown, there are cases in which the input of data cannot be accepted all at once, and, in such a case, suspension and continuation of the processing for storing the data in the queue are performed while dividing the reception up, and finally the processing for storing to the queue completes.

Next, the processing proceeds to step S1304 and the CPU 401 determines whether or not there is data that should be processed in the queue, and, if there is no data in the queue that should be processed, the processing for data input from the port of step S1301 is returned to. When the CPU 401 in step S1304 determines that data that should be processed exists in the queue, the processing proceeds to step S1305, and the CPU 401 functions as the virtual device language monitor 323 and extracts the data from the queue, and initiates the transmission of the print job to the image forming apparatus 108. First, the CPU 401 in step S1306 functions as the virtual device language monitor 323, and obtains status information from the image forming apparatus 108. Next, the processing proceeds to step S1307, and the CPU 401 functions as the virtual device language monitor 323, and communicates with an engine monitor of the image forming apparatus 108. Then, the processing proceeds to step S1308, and the CPU 401 functions as the virtual device language monitor 323 and uses the status information of the image forming apparatus 108 to further perform transmission of image data matched to the engine status of the image forming apparatus 108. After, the processing proceeds to step S1309, whether the transmission of the image data is terminated is investigated, and, when transmission of the image data is not terminated, processing proceeds to step S1306, and the processing described previously is executed. Finally, when the print terminates, the processing returns to step S1301.

Meanwhile, when the CPU 401 in step S1302 determines that the reception module 320 did not receive data that is necessary to process, in other words, when a print job is not received, the processing proceeds to step S1311 (FIG. 13B). The CPU 401 in step S1311 determines whether or not a command for controlling the image forming apparatus 108 from the V4 driver 103, in other words, a command to obtain the image processing parameter of the image forming apparatus 108 is received. Here, when it is determined that there was no reception of a command to obtain the image processing parameter, the processing proceeds to step S1315, and, when it is determined that a command to obtain the parameter in step S1311 is obtained, the processing proceeds to step S1312. The CPU 401 in step S1312 functions as the virtual device language monitor 323, and transmits the command to obtain the image processing parameter to the image forming apparatus 108. Then, the response is awaited in step S1313, and, when the response is received, the processing proceeds to step S1314, the response is transferred to the V4 driver 103, and the processing proceeds to step S1315.

The CPU 401 in step S1315 determines whether or not the command for controlling the image forming apparatus 108 is received from the status window 105. If the command is received, the processing proceeds to step S1316, and, if not, the processing proceeds to step S1319. The CPU 401 in step S1316 functions as the virtual device language monitor 323, analyzes the content of the control command, and transmits the control command corresponding to the analysis result to the image forming apparatus 108. Then, the processing proceeds to step S1317, and a response from the image forming apparatus 108 in relation to the command is awaited. Then, when the response is received, the processing proceeds to step S1318, and the contents of the response are transmitted to the status window 105, or the like, and the processing proceeds to step S1319.

The CPU 401 in step S1319 determines whether or not there is another command that should be transmitted to the image forming apparatus 108, and, if so, the processing proceeds to step S1320, and if not, the processing proceeds to step S1323. The CPU 401 in step S1320 functions as the virtual device language monitor 323, transmits the another control command to the image forming apparatus 108, and awaits a response from the image forming apparatus 108 relating to the control command in step S1321. Then, when the response is received, the processing proceeds to step S1322 and the CPU 401 functions as the virtual device language monitor 323 to cause the response to be reflected in the virtual device's service 106, and the processing returns to step S1301. Note, the CPU 401 in step S1323 reads and discards the data and the processing returns to step S1301 if some data arrives but it is not a control command that should be processed.

With such a configuration, the virtual device's service according to the first embodiment can match the print job accepted from the V4 driver to a status of the image forming apparatus (printer), and transmits the print job to cause printing. Also, it is possible to obtain the parameter of the image forming apparatus to reply to the V4 driver when a command to obtain the parameter of the image forming apparatus is accepted from the V4 driver. Furthermore, a status of the image forming apparatus can be obtained in accordance with a request from a status window.

Figure 16:
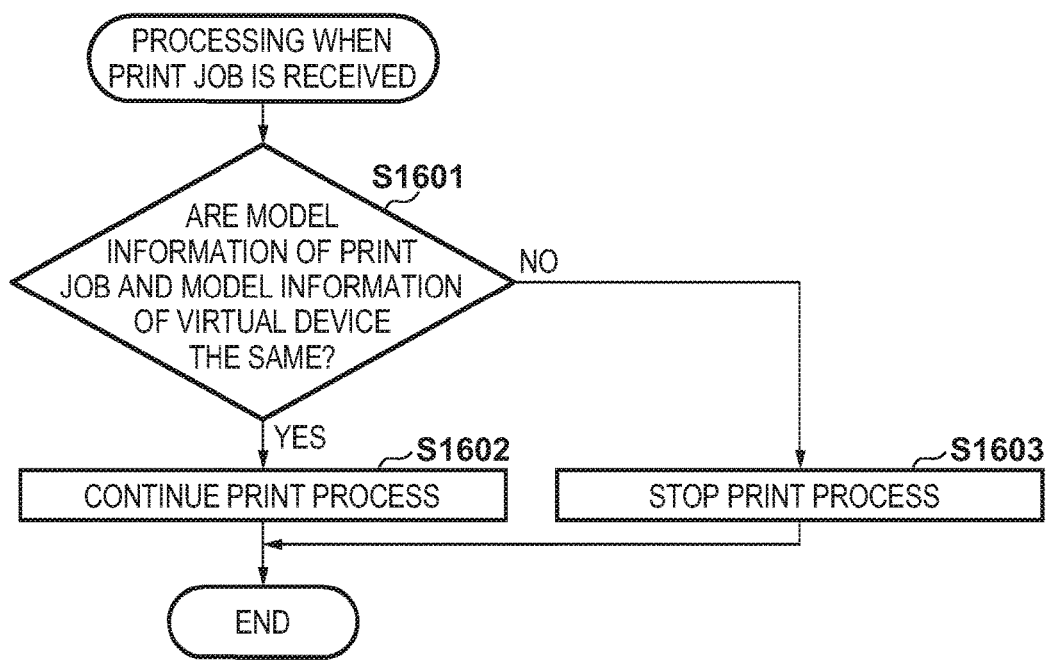
FIG. 16 is a flowchart for describing a process in which the information processing apparatus determines whether there is no problem with a connection between the V4 driver and a virtual device according to the first embodiment.

FIGS. 14 through 16 are flowcharts that describe error processing regarding the connection of the V4 driver 103, the status window 105, the virtual device 301, and the image forming apparatus 108 in the information processing apparatus 101 according to the first embodiment.

FIG. 14 is a flowchart for describing a process in which the information processing apparatus 101 determines whether there is no problem with a connection between the virtual device 301 and the image forming apparatus 108 according to the first embodiment. Note, the processing is achieved by the CPU 401 of the information processing apparatus 101 deploying a program stored in the HDD 405 into the RAM 402 and executing the program. The processing is initiated when the virtual device 301 and the image forming apparatus 108 connect.

First, the CPU 401 in step S1401 functions as the virtual device language monitor 313, and obtains the model information from the image forming apparatus 108. In the first embodiment, the model information is a product name. Next, the processing proceeds to step S1402 and the CPU 401 functions as the virtual device language monitor 323, and compares the model information that the virtual device 301 has and the obtained model information. Here, if the model information that the virtual device 301 has and the obtained model information are the same, the processing proceeds to step S1403, and if they are different from each other, the processing proceeds to step S1404. The CPU 401 in step S1403 functions as the virtual device language monitor 323, and determines that there is no problem in connection, and terminates the processing. On the other hand, the CPU 401 in step S1404 functions as the virtual device language monitor 323, and determines an error status was entered because there was a problem in the connection with the image forming apparatus 108, and terminates the processing. Note, the error status and the model information regarding the connection are replied if the virtual device language monitor 323 accepts a command for obtaining the status information in a situation in which it is determined that an error state has been entered in step S1404.

FIG. 15 is a flowchart for describing a process in which the information processing apparatus 101 determines whether or not an error regarding a connection between the status window 105 and the virtual device 301 is displayed according to the first embodiment. Note, this processing is achieved by the CPU 401 of the information processing apparatus 101 deploying a program stored in the HDD 405 into the RAM 402 and executing the program. The processing is initiated by the status window 105 commanding the virtual device 301 to obtain the status information.

The CPU 401 in step S1501 functions as the status window 105, and obtains the model information and the status information of the image forming apparatus 108 that are designated as a reply to a command to obtain the status information performed made to the virtual device 301. Next, the processing proceeds to step S1502 and the CPU 401 functions as the status window 105, and compares the model information that the status window 105 has and the obtained model information. Then, if the model information that the status window 105 has and the obtained model information are the same, the processing proceeds to step S1504, and, if they are not the same, the processing proceeds to step S1503. The CPU 401 in step S1503 functions as the status window 105, and compares the importance of the error status regarding the connection with the obtained status information. In the first embodiment, the status window 105 holds the importance of all statuses that include the error status regarding the connection, and this is referenced and determined. Then in step S1503, when the error status regarding the connection is determined to be of higher importance, the processing proceeds to step S1505, and, when this is not the case, the processing proceeds to step S1504. The CPU 401 in step S1504 functions as the status window 105, and performs a display based on the obtained status information, and terminates this processing. Meanwhile, the CPU 401 in step S1505 functions as the status window 105, and displays the error status regarding the connection as illustrated in FIG. 17, for example, and terminates this processing.

Figure 17:
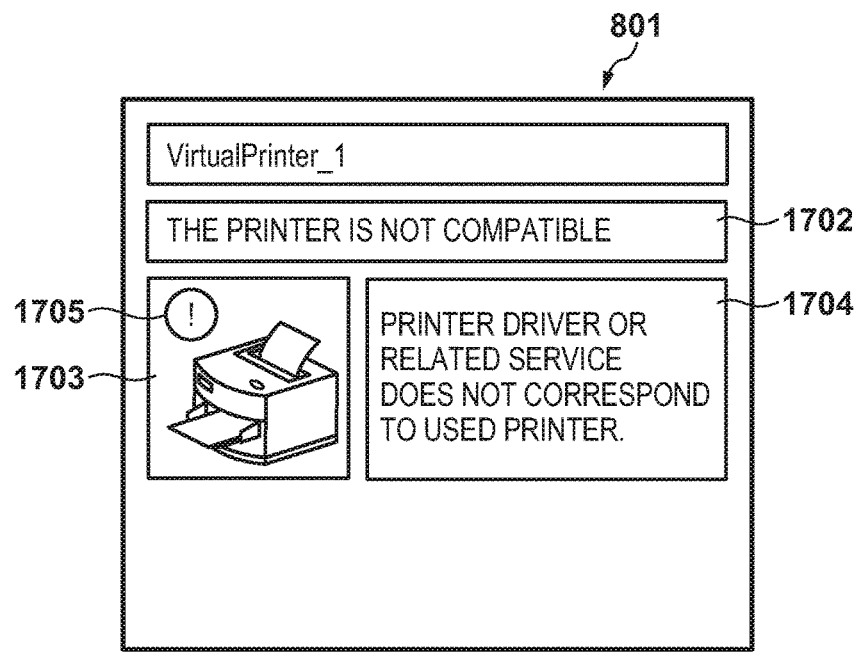
FIG. 17 depicts a view illustrating an example of a status window TOP screen that is displayed in a case in which an error regarding a connection between a status window and a virtual device occurs on the information processing apparatus according to the first embodiment.

FIG. 17 depicts a view illustrating an example of the status window TOP screen 801 that displays on the display unit 410 in a case in which an error regarding a connection between the status window 105 and the virtual device 301 occurs in the information processing apparatus 101 according to the first embodiment.

Messages that indicate a non-match between the model information obtained from the virtual device 300 and the model information of the status window 105 are displayed in a main message 1702 and a support message 1704. Also, although not illustrated in the figure, a configuration may be taken so as to display as attribute information, in a case in which a print job is input, that automatic deletion was performed since it was impossible to print. An image of the image forming apparatus 108, to which a mark 1705 that indicates the error that occurred is added, is displayed in a status screen 1703.

FIG. 16 is a flowchart for describing a process in which the information processing apparatus 101 determines whether there is no problem with a connection between the V4 driver 103 and the virtual device 301 according to the first embodiment. Note, this processing is achieved by the CPU 401 of the information processing apparatus 101 deploying a program stored in the HDD 405 into the RAM 402 and executing the program. The processing is initiated when the virtual device language monitor 323 receives a print job.

First, in step S1601, the CPU 401 functions as the virtual device language monitor 323, and compares the model information that the received print job has and model information of the virtual device 301. Then, if the model information that the received print job and the model information of the virtual device 301 are determined to be the same, the processing proceeds to step S1602, and, if they are not, the processing proceeds to step S1603. The CPU 401 in step S1602 functions as the virtual device language monitor 323, determines that the V4 driver 103 and the virtual device 301 are successfully connected, and continues the print process of the received print job. Meanwhile, the CPU 401 in step S1603 functions as the virtual device language monitor 323, determines that the V4 driver 103 and the virtual device 301 are not correctly connected, stops the process of the received print job, and terminates the processing. Note, in the first embodiment, the virtual device language monitor 323 in step S1603 stops the print process by deleting the received print job.

Figure 18:
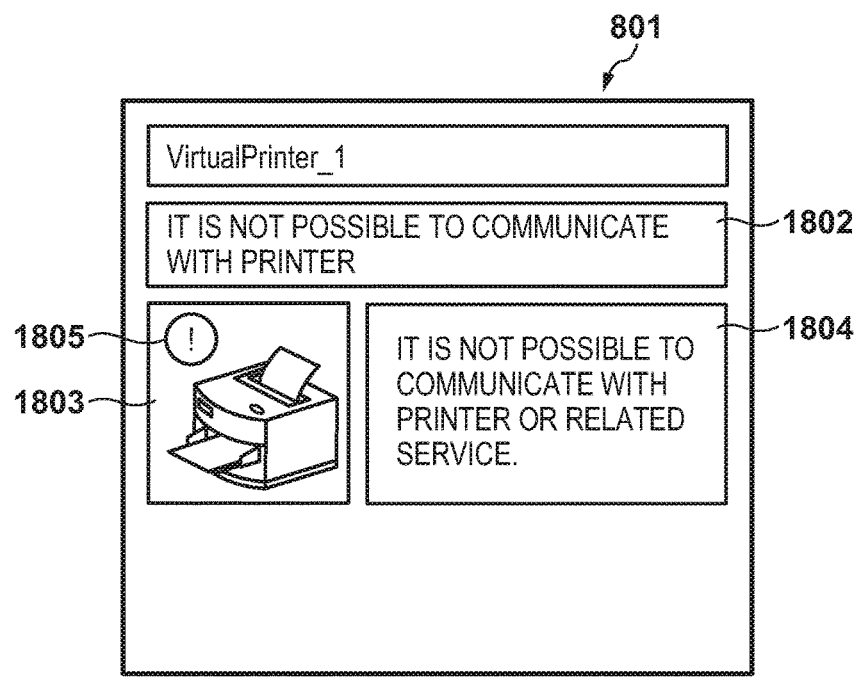
FIG. 18 illustrates an example of a status window TOP screen that is displayed in a case in which a status window and a virtual device's service cannot communicate on the information processing apparatus according to the first embodiment.

FIG. 18 depicts a view illustrating an example of the status window TOP screen 801 that the status window 105 displays in a case in which communication with the virtual device's service 106 was not possible in the information processing apparatus 101 according to the first embodiment (hereafter referred to as a virtual device communication error).

The status window 105 uses RPC communication to communicate with the virtual device's service 106. In a case in which RPC communication with the virtual device's service 106 fails, the virtual device communication error displays regardless of the power source of the image forming apparatuses 107 and 108 being OFF/ON.

Messages indicating that communication with the virtual device's service 106 was not possible are displayed in a main message 1802 and a support message 1804. An image of the image forming apparatus 108, to which a mark 1805 that indicates the error that occurred is added, is displayed in a status screen 1803.

As described above with respect to the first embodiment, there is an effect that even in an environment in which the information processing apparatus has the V4 driver installed, the V4 driver can be used to achieve print process similar to the V3 driver in the image forming apparatus corresponding to the host-based print system.

[Second Embodiment]

Next, an explanation will be given for a second embodiment according to the present invention.

Figure 19:
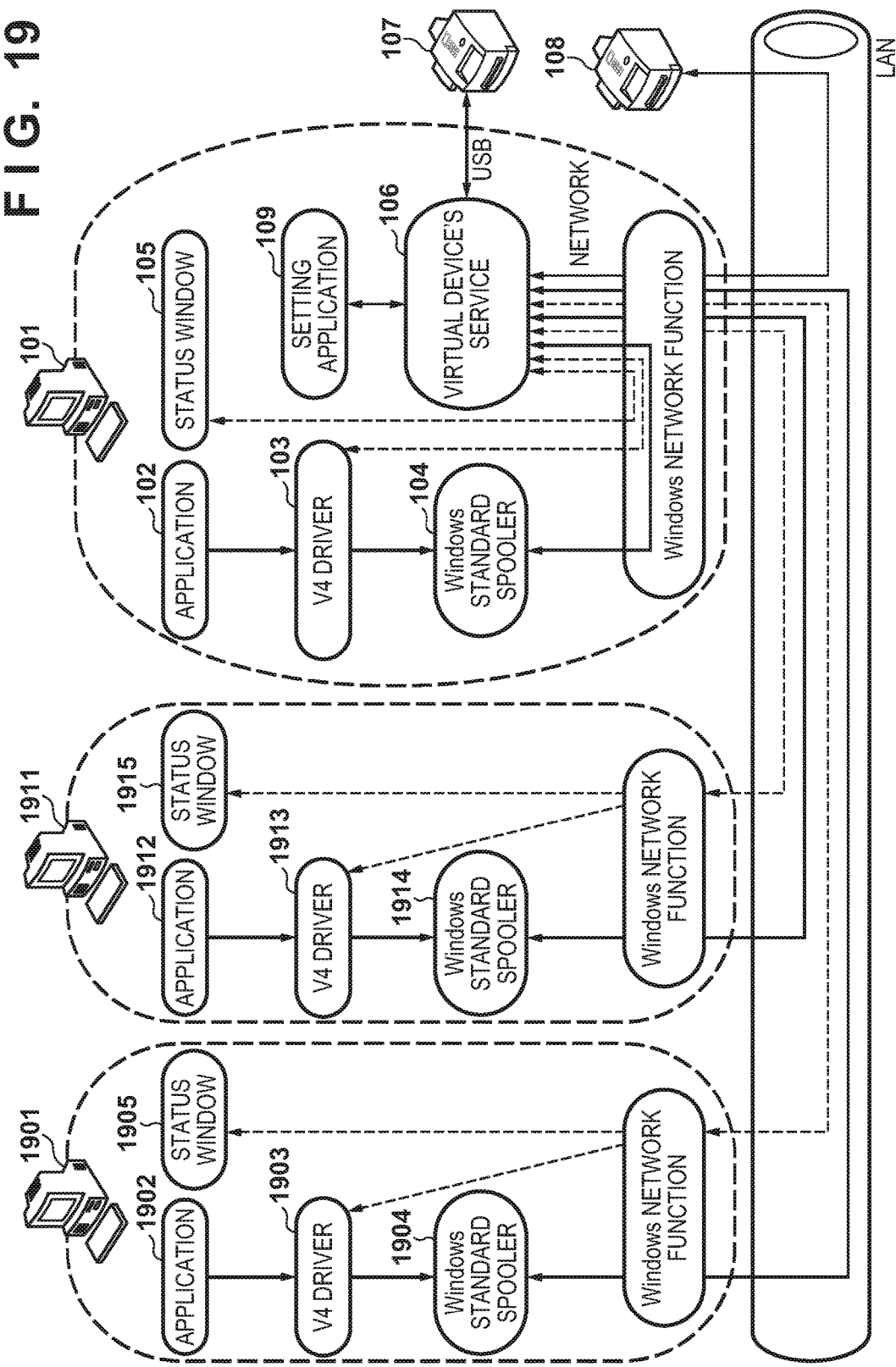
FIG. 19 illustrates an overview configuration of a print system according to a second embodiment of the present invention.

FIG. 19 is a block diagram illustrating an overview configuration of a print system according to the second embodiment of the present invention. In the drawing, thick, solid lined arrow symbols indicate an exchange of a print job, and thin, dashed lined arrow symbols indicate an exchange of data other than a print job.

In this configuration of the print system, two information processing apparatuses 1901 and 1911 are connected via a network in the configuration of FIG. 1 according to the first embodiment described previously. The two information processing apparatuses 1901 and 1911 function as clients respectively, and can cause the image forming apparatuses 107 and 108 to execute a print job through the information processing apparatus 101 functioning as a server.

The information processing apparatuses 1901 and 1911 functioning as the clients respectively have applications 1902 and 1912, V4 drivers 1903 and 1913, Windows® standard spoolers 1904 and 1914, and status windows 1905 and 1915.

Description regarding these is the same as in the first embodiment. There is a difference of the following configuration in the system configuration between this second embodiment and the first embodiment.

The Windows® standard spoolers 1904 and 1914 transmit via the network print jobs to the image forming apparatuses registered to respective transmission destination ports with respect to the virtual device's service 106 of the information processing apparatus 101 that functions as the server. The status windows 1905 and 1915 use RPC to perform communication with the virtual device's service 106 of the information processing apparatus 101 that functions as the server. Note, processing executed in the print system according to the second embodiment is essentially the same as in the case of the first embodiment described previously.

By the second embodiment, as explained above, a print job can be transmitted from a client-server-connected client to the image forming apparatus through the virtual device's service of the server to cause printing.

Other Embodiments

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out to and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus having a printer driver and a device service being associated with the printer driver as an output port of a print job generated by the printer driver, the information processing apparatus comprising:
   (a) the printer driver configured to receive data generated in accordance with a print instruction from an application operating on the information processing apparatus and to generate a print job based on the received data, and to output the print job to the output port, wherein the print job is sent to the device service by an operating system (OS);
   (b) the device service configured:
      (i) to connect to a print apparatus via a port that is different from the output port of the information processing apparatus;
      (ii) to receive the print job from the printer driver;
      (iii) to transmit, to the print apparatus, a first control command for obtaining status information of the print apparatus;
      (iv) to obtain the status information of the print apparatus in accordance with having received a response to the first control command from the print apparatus, and to transmit the print job based on the status information of the print apparatus; and
      (v) to accept print data received through a receiving port, wherein the OS sends the print job to the receiving port using internal loopback.

2. The information processing apparatus according to claim 1, wherein the device service saves the print job accepted from the driver to a queue, and reads the print job saved in the queue to transmit it to the print apparatus.

3. The information processing apparatus according to claim 1, wherein the device service is further configured:
   (vi) to accept a second control command for obtaining the status information of the print apparatus from the printer driver, to change the second control command to the first control command, and to transmit the first control command to the print apparatus; and
   (vii) to notify the printer driver of the status information of the printing apparatus as a response to the second control command,
   wherein the device service notifies an error in a case in which model information of a print apparatus that the device service manages does not match model information included in the response from the print apparatus with respect to the first control command, and
   wherein the printer driver is further configured to display a printer status screen on a display device, upon accepting the status information of the printing apparatus as the response to the second control command from the device service.

4. The information processing apparatus according to claim 1, wherein the device service does not execute the print job in a case in which model information of a print apparatus that the device service manages does not match model information included in the print job accepted from the printer driver.

5. The information processing apparatus according to claim 1, further comprising a setting unit configured to perform a change or a setting of the print apparatus that the device service manages.

6. The information processing apparatus according to claim 1, wherein, when a print apparatus is connected to the information processing apparatus, the device service obtains information of the print apparatus from the print apparatus, manages the print apparatus if the obtained information matches information of a print apparatus that the device service manages, and identifies an error in a case in which the obtained information does not match the information of a print apparatus that the device service manages.

7. The information processing apparatus according to claim 1, wherein the device service is print apparatus emulator software installed on the information processing apparatus and the printer driver is a printer driver conforming to version 4 print architecture of Windows®.

8. The information processing apparatus according to claim 1, wherein the information processing apparatus is able to connect to a plurality of print apparatuses and the device service handles each of the plurality of print apparatuses.

9. A method of controlling an information processing apparatus having a printer driver and a device service being associated with the printer driver as an output port of a print job generated by the printer driver, the method comprising:
   (a) receiving, in the printer driver, data generated in accordance with a print instruction from an application operating on the information processing apparatus, generating, in the printer driver, a print job based on the received data, and outputting, from the printer driver, the print job to the output port, wherein the print job is sent to the device service by an operating system (OS);
   (b) connecting the device service to a print apparatus via a port that is different from the output port of the information processing apparatus;
   (c) receiving the print job from the printer driver;
   (d) transmitting, from the device service to the print apparatus, a first control command for obtaining status information of the print apparatus;
   (e) obtaining, by the device service, the status information of the print apparatus in accordance with having received a response to the first control command from the print apparatus, and transmitting the print job based on the status information of the print apparatus; and
   (f) accepting, by the device service, print data received through a receiving port,
   wherein the OS sends the print job to the receiving port using internal loopback.

10. A non-transitory computer-readable storage medium storing a program for causing a processor to execute a method of controlling an information processing apparatus having a printer driver and a device service being associated with the printer driver as an output port of a print job generated by the printer driver, the method comprising:
   (a) receiving, in the printer driver, data generated in accordance with a print instruction from an application operating on the information processing apparatus, generating, in the printer driver, a print job based on the received data, and outputting, from the printer driver, the print job to the output port, wherein the print job is sent to the device service by an operating system (OS);
   (b) connecting the device service to a print apparatus via a port that is different from the output port of the information processing apparatus;
   (c) receiving the print job from the printer driver;
   (d) transmitting, from the device service to the print apparatus, a first control command for obtaining status information of the print apparatus;
   (e) obtaining, by the device service, the status information of the print apparatus in accordance with having received a response to the first control command from the print apparatus, and transmitting the print job based on the status information of the print apparatus; and
   (f) accepting, by the device service, print data received through a receiving port,
   wherein the OS sends the print job to the receiving port using internal loopback.

11. The information processing apparatus according to claim 1, wherein the device service manages the print job received from the printer driver and the print job transmitted to the print apparatus.

* * * * *